United States Patent
Heffner

[11] Patent Number: 5,971,538
[45] Date of Patent: Oct. 26, 1999

[54] ARTICULATED NOSE BRIDGE FOR HEAD MOUNTED DISPLAY

[75] Inventor: Brian L. Heffner, Los Altos, Calif.

[73] Assignee: Hewlett-Packard Company, Palo Alto, Calif.

[21] Appl. No.: 09/183,735

[22] Filed: Oct. 30, 1998

[51] Int. Cl.[6] .................................................. G02C 5/12
[52] U.S. Cl. ............................. 351/137; 351/136; 345/8
[58] Field of Search ............................. 345/8; 351/41, 351/51, 136, 137, 138, 139, 158

[56] References Cited

U.S. PATENT DOCUMENTS

| | | | |
|---|---|---|---|
| 4,190,334 | 2/1980 | O'Neil | 351/82 |
| 4,280,758 | 7/1981 | Flader et al. | 351/55 |
| 4,405,213 | 9/1983 | Kilkmann | 351/59 |
| 4,740,069 | 4/1988 | Baum | 351/57 |
| 4,787,729 | 11/1988 | Ruffen | 351/137 |
| 4,813,776 | 3/1989 | Borsos | 351/137 |
| 4,834,524 | 5/1989 | Borsos | 351/132 |
| 4,902,119 | 2/1990 | Porsche | 351/137 |
| 5,159,359 | 10/1992 | Pauly et al. | 351/128 |
| 5,680,193 | 10/1997 | Epstein | 351/41 |
| 5,691,796 | 11/1997 | Negishi. | 351/55 |
| 5,739,893 | 4/1998 | Karasawa et al. | 351/158 |
| 5,757,339 | 5/1998 | Williams et al. | 345/8 |
| 5,774,096 | 6/1998 | Usuki et al. | 345/8 |
| 5,812,224 | 9/1998 | Maeda et al. | 349/13 |
| 5,815,126 | 9/1998 | Fan et al. | 345/8 |
| 5,880,773 | 3/1999 | Suzuki | 345/8 |

*Primary Examiner*—Hung Xuan Dang
*Attorney, Agent, or Firm*—Marc R. Mayer

[57] ABSTRACT

An articulated nose bridge for a head mounted display for adjusting the height, tilt, and distance of the display on the wearer's face. The articulated nose bridge including a nose piece configured to rest on a wearer's nose, a bridge piece located between a left eye display and a right eye display of the head mounted display, and an articulator. The articulator includes a nose end coupled to the nose piece, and a bridge end pivotally coupled to the bridge piece and allowing a viewing angle of the left eye display and the right eye display to be adjusted by the wearer. The articulated nose bridge may additionally include a locking mechanism having a locked position that prevents the bridge end of the articulator from pivoting and a free position that allows the bridge end of the articulator to pivot. The locking mechanism may include a spring or tensioner that automatically returns the locking mechanism to the locked position after the wearer has moved the locking mechanism into the free position. In addition, the nose end of the articulator is pivotally coupled to the nose piece. Further, the locking mechanism may include a gear segment and a pawl configured to engage the gear segment in the locked position.

21 Claims, 19 Drawing Sheets

FIG. 3A

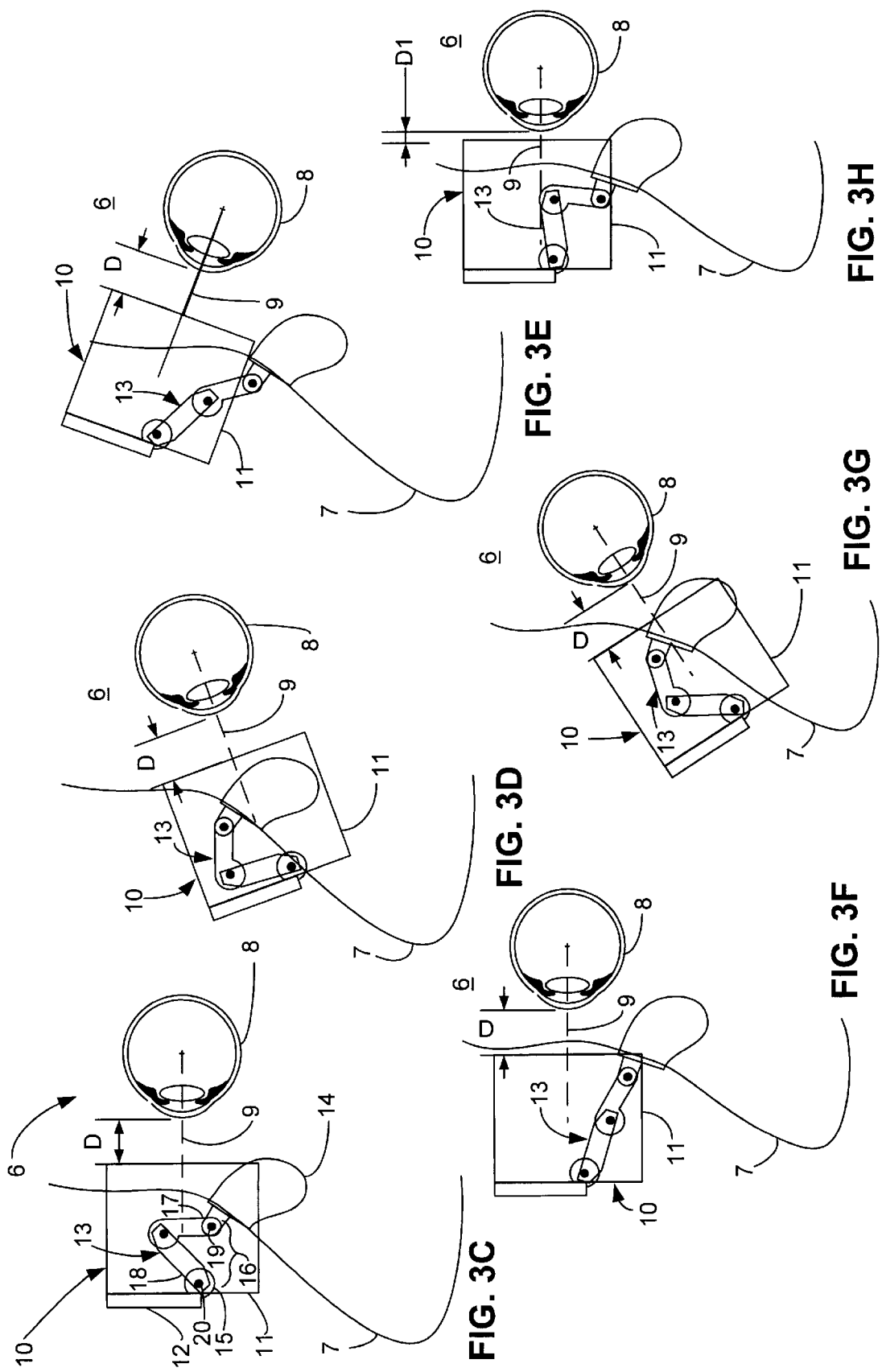

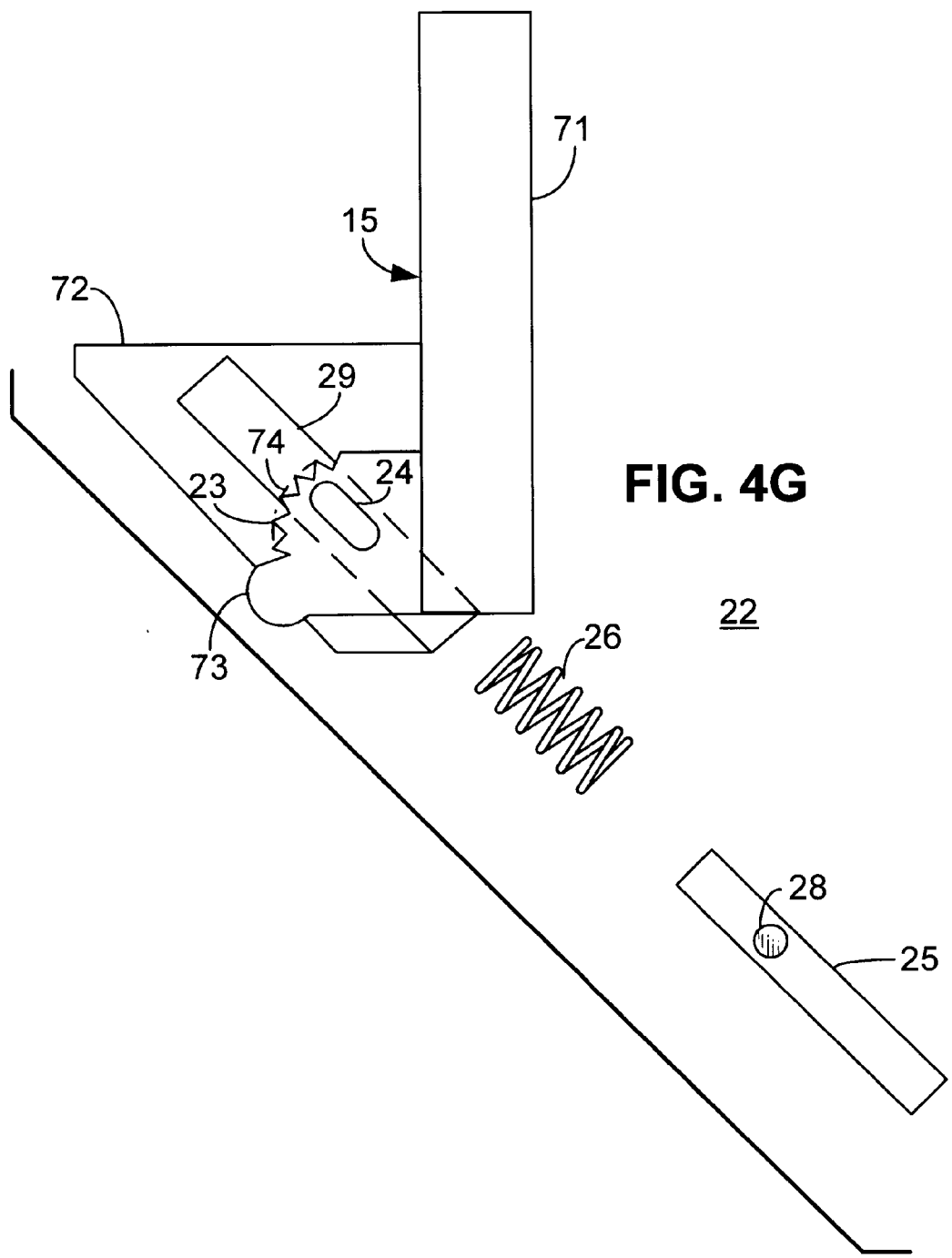

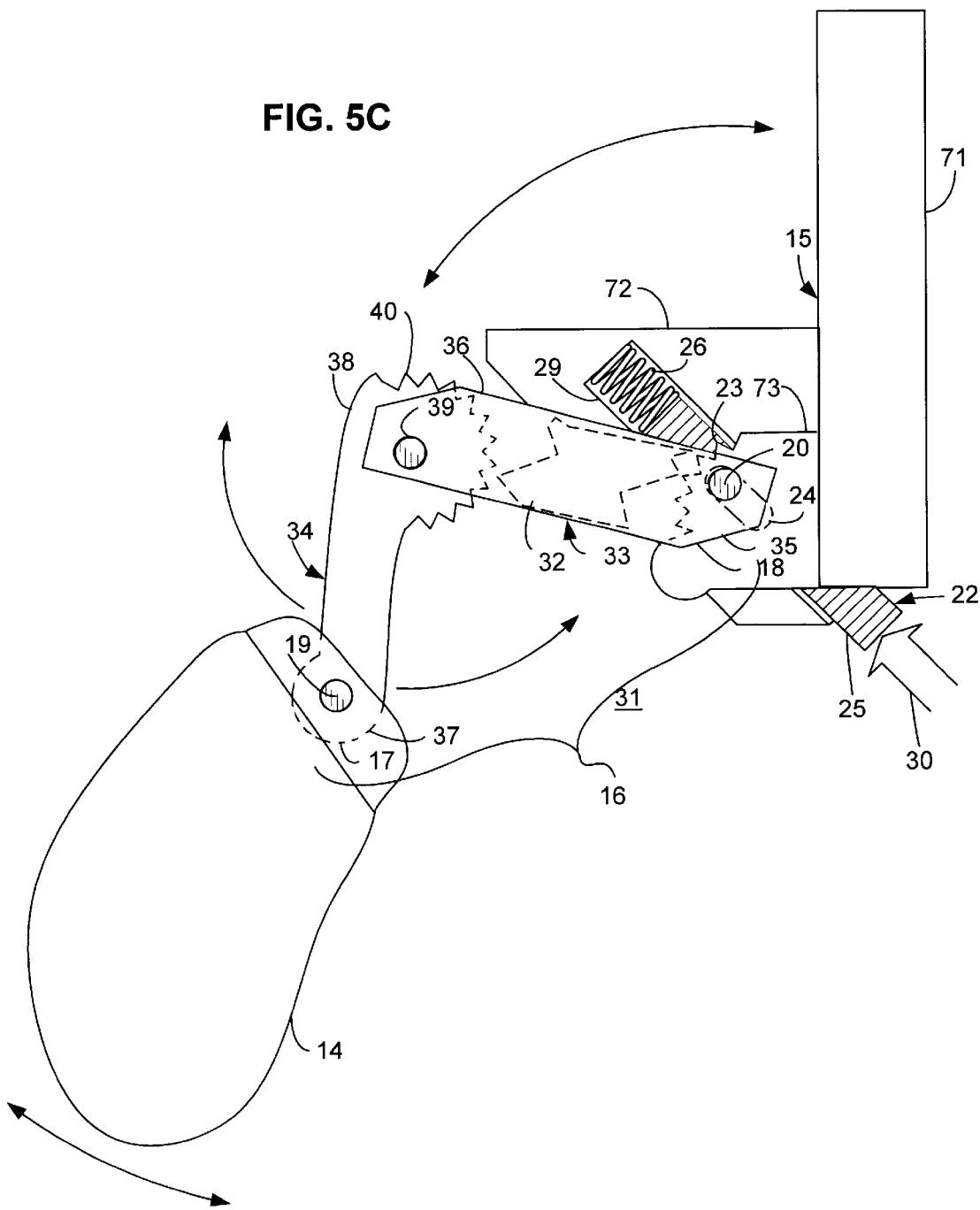

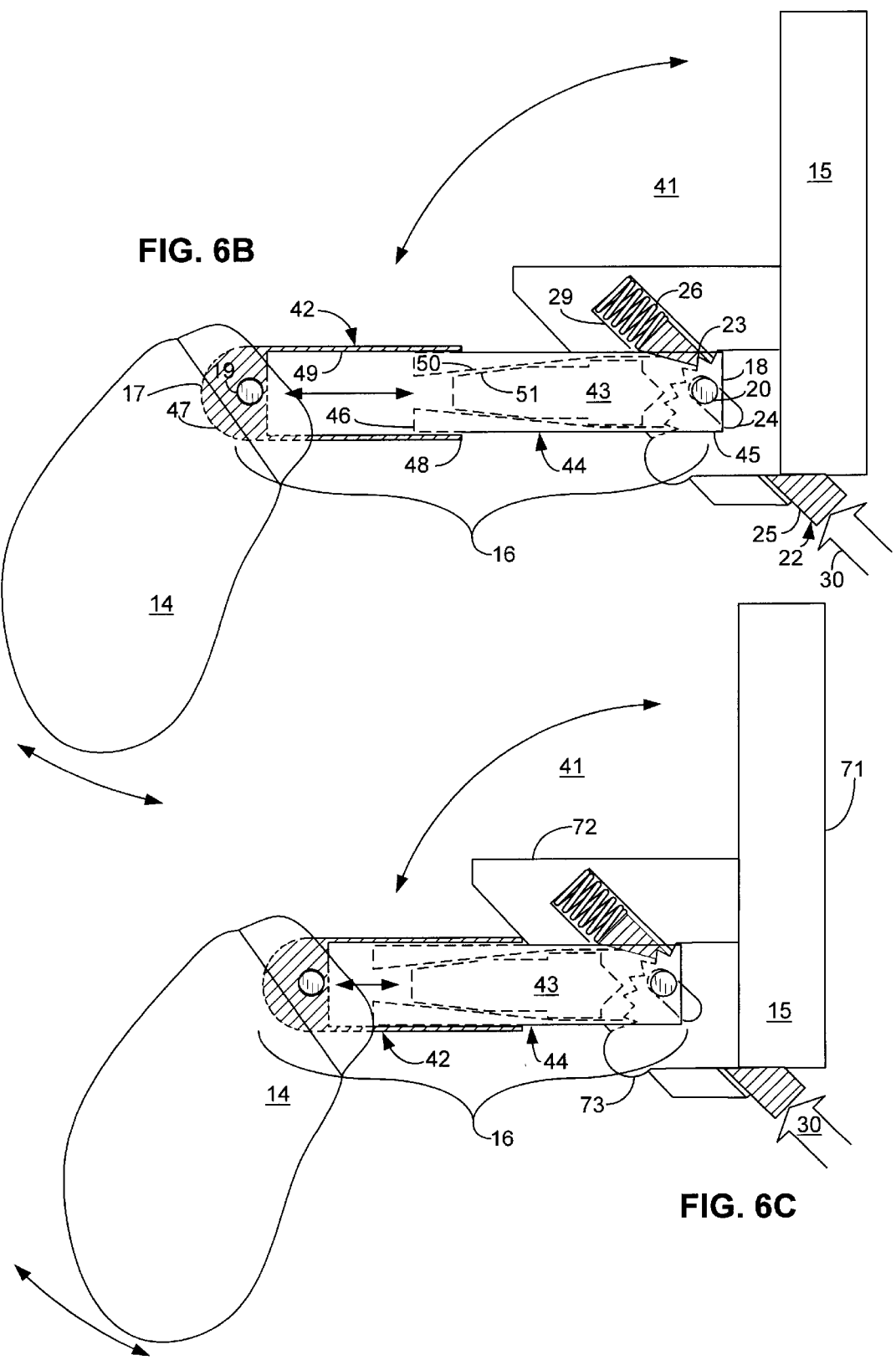

ARTICULATED NOSE BRIDGE FOR HEAD MOUNTED DISPLAY

BACKGROUND OF THE INVENTION

1. Field of the Invention

The present invention relates generally to head mounted displays and more particularly to adjustment mechanisms for controlling the alignment of the head mounted displays with a wearer's eyes.

2. Description of the Related Art

Head mounted displays have been used for years in a number of applications as a replacement for the conventional cathode-ray-tube (CRT) and liquid-crystal flat panel displays. Head mounted displays have been used, for example, in 3-D applications, video game applications, virtual reality applications, military applications, and other applications where mobility or privacy are desirable.

Traditionally, head mounted displays have been either mounted to helmets worn by the user, or incorporated mechanisms that used a compression fit against the head to keep the display in place. One examples of such a mechanism is shown in U.S. Pat. No. 5,739,893, entitled "Head-Mounted Image Display Apparatus." This mechanism controls the position of the head mounted display by adjusting the compression between a pad pressing against the back of the head and a pad that rests on the forehead. A similar mechanism is shown in U.S. Pat. No. 5,812,224 entitled, "Head-Mount Image display Apparatus" in which the pads at the back of the head are spring loaded to control the pressure.

Another example of a compression fit mechanism is shown in U.S. Pat. No. 5,757,339, entitled "Head Mounted Display." This mechanism allows a wearer to adjust the position of the display by controlling the circumference of a padded headband. A similar headband mechanism is depicted in U.S. Pat. No. 5,774,096, entitled "Head Mounted Display." These mechanisms give the wearer some ability to adjust the height of the display relative to the eye.

Recently, some head mounted displays have been developed that are worn more like eyeglasses (eyeglass displays). These eyeglass displays support the entire weight of the head mounted display on the wearer's ears and nose. Thus, if the position of the eyeglass displays on the face is to be adjusted, the adjustment should occur either between the ear contacts and the "rims" of the eyeglass display, or between the nose contact and "bridge" located between the rims of the eyeglass display.

Eyeglass displays having a nose bridge 1 that can be adjusted in and out to control the distance between the wearer's eyes and the video display portions 2 of the eyeglass displays are shown in FIG. 1 and described in U.S. Pat. No. 5,815,126, entitled "Monocular Portable Communication and Display System." This adjustable nose bridge allows the wearer to select the optimal viewing distance between the eye and the display portion of the eyeglass display despite variations in the wearer's facial structure and vision. The eyeglass display shown in FIG. 1, however, lack a nose bridge that can adjust to accommodate variations in height and tilt that might be desired by the wearer.

Height adjustment for eyeglasses, on the other hand, have been considered in the past. For example, controlling the height of bifocal eyeglasses using an adjustable nose bridge is shown in FIG. 2A and FIG. 2B and additionally described in U.S. Pat. No. 4,280,758. Adjusting the height of bifocals allows the wearer to position the lower (reading) lenses 3 of the bifocal glasses 4 where they are most convenient for the task at hand. Thus, when reading a book on a table a wearer might prefer the reading lenses low so she could conveniently look down through the reading lenses at the book without having to tilt her head down in an exaggerated way to interpose the reading lenses between her eyes and the book. At the same time, the lowered reading lenses allow the wearer to look forward through the upper (long distance) lenses 5 at her surroundings. Alternatively, a wearer using a computer might prefer the reading lenses 3 raised in order to view a computer screen through the reading lenses without tilting her head back to interpose the reading lenses between her eyes and the computer screen.

Adjusting the height of an eyeglass display may also offer certain advantages. For example, wearing an eyeglass display low on the face would allow the wearer to make eye contact with another person while conversing. At the same time, the lowered eyeglass display could allow the wearer to glance down and view data relevant to the conversation displayed on the eyeglass display. Alternatively, the lowered eyeglasses may be preferred by a wearer who spends a great deal of time viewing data through the displays so that she may remain aware of her surroundings by looking over the top of the eyeglass display.

Similarly, a wearer might choose to wear the eyeglass display high on the face. This configuration might be convenient for those who work with their hands and follow complex procedures such as doctors or mechanics. The raised eyeglass display may be used, for example, to show instructions, diagrams, or alternate views of the subject to the wearer. At the same time, the wearer's hands, any instruments or tools, and the subject of the instructions are in full view below the eyeglass display.

Finally, despite the advantages discussed above of wearing the eyeglass display high or low on the face, some wearers will undoubtedly prefer to wear the eyeglass display at eye level on the face. This position would be the most distraction free and thus it might be preferred for viewing a movie, enjoying a virtual reality experience, or simply concentrating on important work.

Merely raising and lower the eyeglass display on the face using a mechanism similar to that shown in FIG. 2A and FIG. 2B, however, will not allow the most efficient viewing of the eyeglass display by the wearer. This is because the images displayed within the eyeglass display are typically configured to be viewed optimally when the wearer's line of sight is perpendicular to the plane of the image. Usually, the eyeglass display is configured so that the perpendicular viewing angle is achieved when the eyeglass display is worn at eye level. When the height of the eyeglass display on the face is controlled using a nose bridge that merely raises or lowers, however, the eyeglass display will pivot about the wearer's ears as the height of the eyeglass display is adjusted. Since the wearer's ears rather than the wearer's eyes act as the pivot, the wearer's viewing angle will not remain perpendicular to the plane of the displayed image when the display is moved above or below eye level. To compensate for the change in viewing angle that occurs when the height of the eyeglass display on the face is changed, the eyeglass displays should include an adjustment for tilt. The tilt adjustment would allow the optimal perpendicular viewing angle to be achieved at whatever height the wearer chooses to wear the eyeglass display.

From the foregoing it will be apparent that there is a need for a nose bridge for an eyeglass display which can be used to adjust the height of the display on the face, the tilt of the display, and the distance between the eye and the display.

SUMMARY OF THE INVENTION

The invention provides an articulated nose bridge for a head mounted display having a left eye display, a right eye display, and a bridge connecting the left eye display to the right eye displays. The articulated nose bridge according to the invention allows easy adjustment of the height of the display on the wearer's face, the tilt of the display, and the viewing distance between the wearer's eyes and the display. The articulated nose bridge according to the invention includes a nose piece configured to rest on a wearer's nose, a bridge piece located between the left eye display and the right eye display, and an articulator. The articulator has a nose end coupled to the nose piece, and a bridge end pivotally coupled to the bridge piece allowing the viewing angle of the left and right eye displays to be adjusted by the wearer.

The adjustable nose bridge may additionally include a locking mechanism having a locked position, preventing the bridge piece from pivoting, and a free position, allowing the bridge piece to pivot. The locking mechanism may include a spring configured to automatically return the locking mechanism to the locked position from the free position. In addition, the nose end of the articulator may be pivotally coupled to the nose piece.

Further, the bridge piece may include a gear segment and the locking mechanism may include a pawl configured to engage the gear segment when in the locked position. The pawl engages with the gear segment prevents the bridge piece from pivoting relative to the articulator when the locking mechanism is in the locked position. The pawl may be affixed to the articulator or may be free to move in one dimension within the articulator.

The articulator may include a bridge segment and a nose segment. The bridge segment includes the bridge end of the articulator and additionally includes a first end and a second end. The nose segment includes the nose end of the articulator and additionally includes a third end and a fourth end that is pivotally coupled to the second end of the bridge segment. The locking mechanism may prevent the nose segment from pivoting about the second end of the bridge segment when the locking mechanism is in the locked position. The fourth end of the nose segment may include a second gear segment, and the pawl may be configured to engage the second gear segment when in the locked position.

The fourth end of the nose segment may alternately be configured to slip over a portion of the bridge segment from the second end allowing adjustment of the length of the articulator by longitudinally adjusting the portion of the bridge segment inserted into the nose segment. The locking mechanism may prevent the bridge segment from moving longitudinally within the nose segment when the locking mechanism is in the locked position. The second end of the bridge segment may be configured to expand against at least one internal surface of the nose segment when an internal pressure is applied to the second end of the bridge segment. In such a case, the locking mechanism may include a wedge for applying the internal pressure to the second end when the locking mechanism is in the locked position.

The bridge piece may define a first through hole, and the articulator may include a nose segment and a bridge segment that defines a second through hole. In such a case, the locking mechanism may include a tensioner and a cable including a cable end affixed to the nose segment. The cable passes through the first through hole and the second through hole. The tensioner pulls the cable end toward the bridge piece when the locking mechanism is in the locked position. Thus, the tensioning force may compress the bridge segment against the bridge piece. An intermediate section defining a third through hole may be interposed between the nose segment and the bridge segment having the cable passes though the third through hole.

Other features and advantages of the present invention will become apparent from the following detailed description, taken in conjunction with the accompanying drawings, illustrating, by way of example, the principles of the invention.

BRIEF DESCRIPTION OF THE DRAWINGS

FIG. 3C is a side view of an articulated nose bridge according to the invention keeping a head mounted display at eye level for a wearer with a large nose and deep set eyes.

FIG. 3D is a side view of an articulated nose bridge according to the invention keeping a head mounted display tilted downward on the face for a wearer with a large nose and deep set eyes.

FIG. 3E is a side view of an articulated nose bridge according to the invention keeping a head mounted display tilted upward on the face for a wearer with a large nose and deep set eyes.

FIG. 3F is a side view of an articulated nose bridge according to the invention keeping a head mounted display at eye level for a wearer with a small nose and a flat face.

FIG. 3G is a side view of an articulated nose bridge according to the invention keeping a head mounted display tilted downward for a wearer with a small nose and a flat face.

FIG. 3H is the side view of the articulated nose bridge depicted in FIG. 3F with the head mounted display held closer to the eyes of the wearer.

FIG. 4G is an exploded view of the locking mechanism depicted in FIG. 4F.

FIG. 5C is a side view of the second embodiment of the articulated nose bridge according to the invention with the locking mechanism in a free position.

FIG. 6B is a side view of the third embodiment of an articulated nose bridge according to the invention with the locking mechanism in the free position and the nose segment extended.

FIG. 6C is a side view of the third embodiment of an articulated nose bridge according to the invention with the locking mechanism in the free position and the nose segment retracted.

DESCRIPTION OF THE PREFERRED EMBODIMENT

Figure 1:
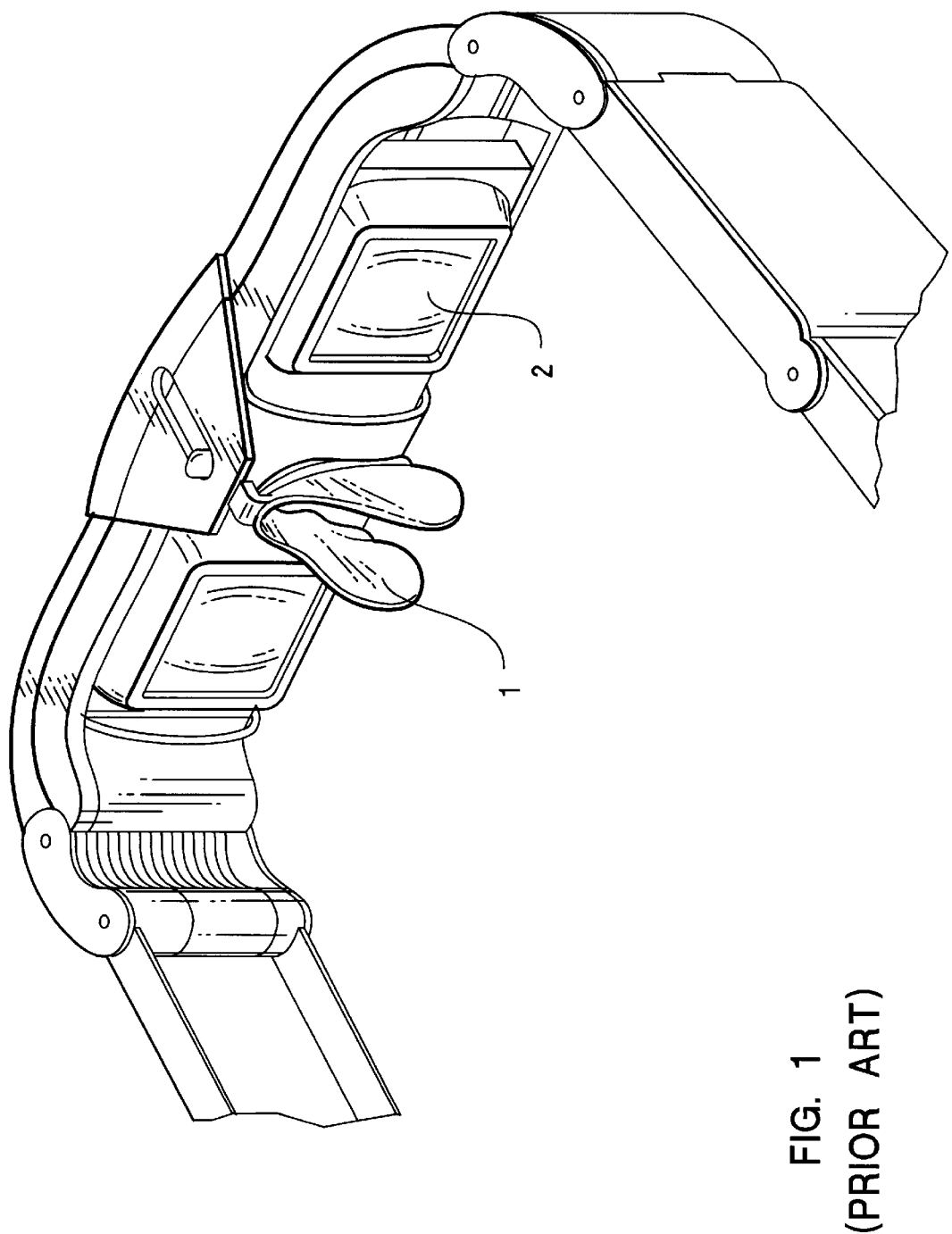
FIG. 1 is a perspective view of a prior art head mounted display featuring an adjustable nose bridge.
Figure 2A:
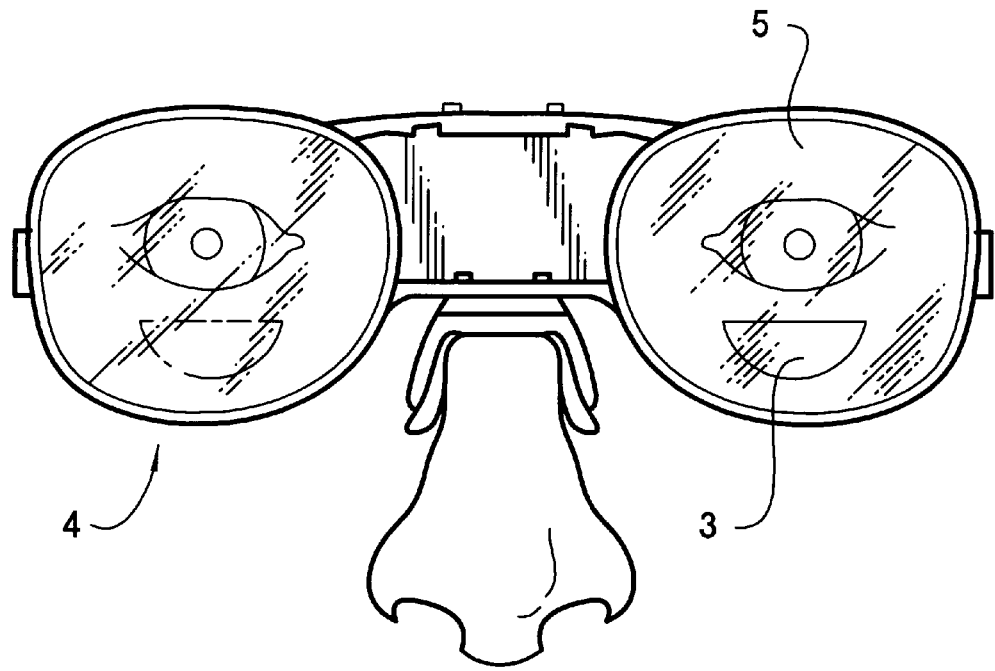
FIG. 2A is a front elevation view of prior art bifocal glasses featuring an adjustable nose bridge in a lowered position.
Figure 2B:
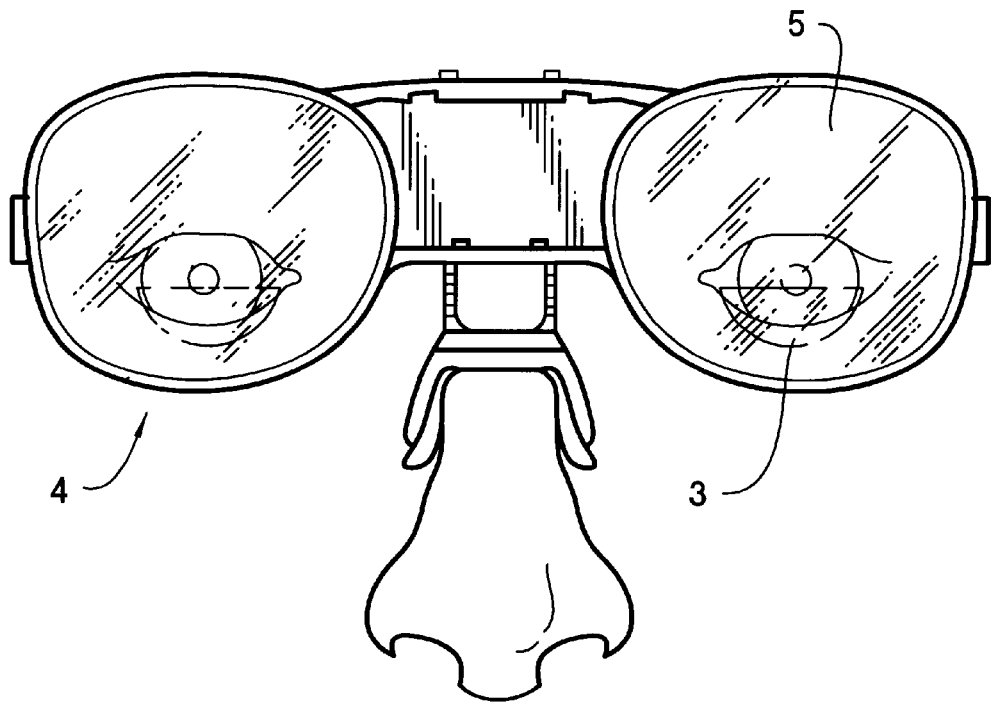
FIG. 2B is a front elevation view of the prior art bifocal glasses of FIG. 2A depicting the adjustable nose bridge in a raised position.

In the following detailed description and in the several figures of the drawings, like elements are identified with like reference numerals. As shown in the drawings for purposes of illustration, the invention provides an articulated nose bridge that can be used to adjust the position of a head mounted display relative to the eyes of the wearer. The articulated nose bridge according to the invention allows wearers having a variety of facial shapes to adjust the head mounted display to a number of facial positions while keeping the eye display perpendicular to the line of sight of the wearer. Some embodiments of the articulated nose bridge according to the invention also allows the wearer to adjust the distance between the head mounted display and the wearer's eye in any facial position selected by the wearer.

Figure 3A:
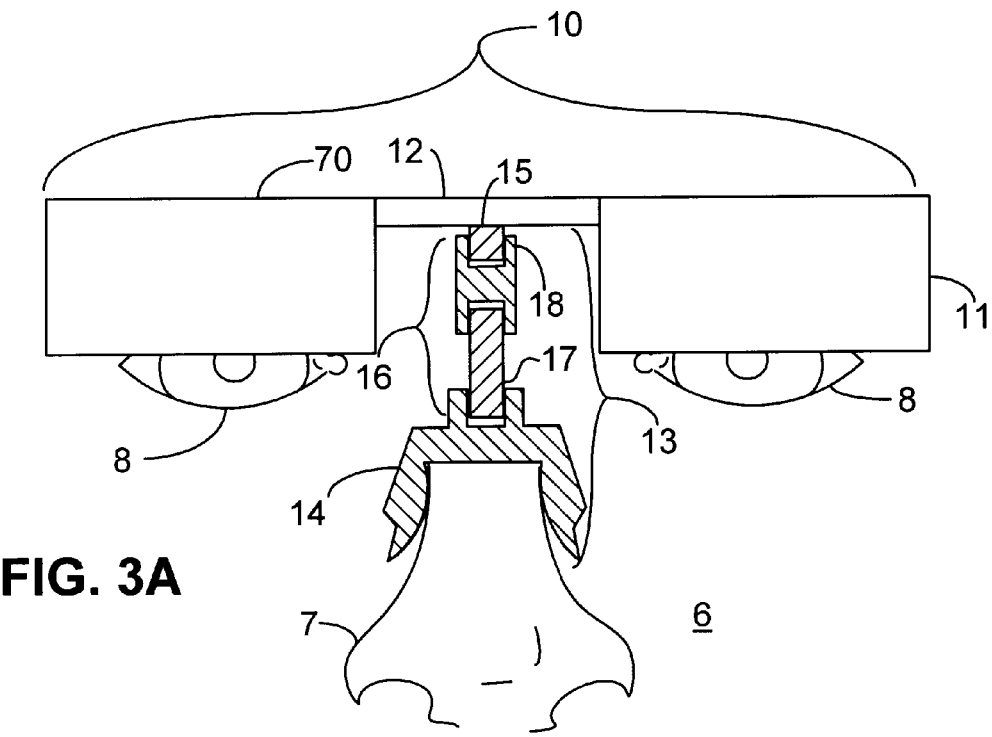
FIG. 3A is a front elevation view of a head mounted display with an articulated nose bridge according to the invention worn high on the face.
Figure 3B:
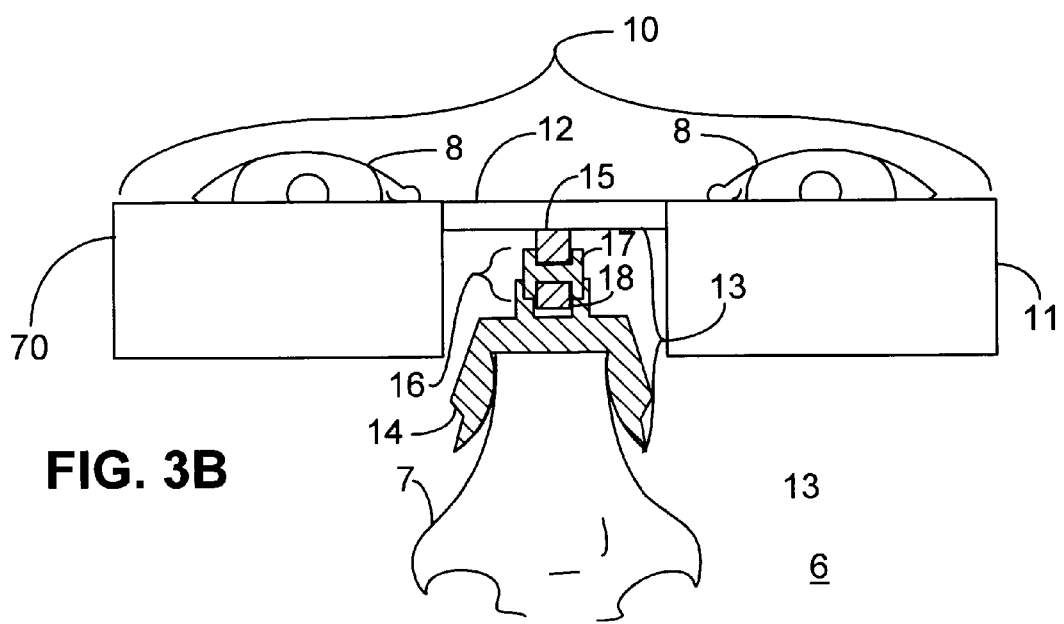
FIG. 3B is a front elevation view of a head mounted display with an articulated nose bridge according to the invention worn low on the face.

FIG. 3A through FIG. 3H depict various positions to which the head mounted display can be adjusted to using an articulated nose bridge according to the invention. The articulated nose bridge depicted in these figures is according to the second embodiment 31 of the invention that will be discussed in detail below. Specifically, FIG. 3A and FIG. 3B are elevation views depicting a head mounted display with an articulated nose bridge according to the second embodiment of the invention worn high on the face and low on the face, respectively. In each of the figures, a wearer's head 6 is depicted by a nose 7 and eyes 8. The head mounted display 10 includes the left eye display 11 and the right eye display 70 connected via a bridge 12. The articulated nose bridge 13 according the invention includes a nose piece 14, a bridge piece 15, and an articulator 16. The nose piece is configured to rest on the wearer's nose 7 and the bridge piece is either attached to or integral with the bridge 12, located between the left and right eye displays 11, 70 of the head mounted display 10. The articulator has a nose end 17 coupled to the nose piece 14 and a bridge end 18 pivotally coupled to the bridge piece 15.

FIGS. 3C through 3H depict the use of an articulated nose bridge according to the a second embodiment of the invention 31 to adjust the head mounted display 10, of which it forms part, to a variety of positions on a variety of facial types. In each of the figures, the left side of the wearer's head 6 is depicted by the nose 7, in profile, and the eye 8 having a line of sight 9. The head mounted display 10 in the figures includes the left eye display 11 depicted as a transparent box so that the articulated nose bridge 13 can be shown. In addition to the nose piece 14, bridge piece 15, and articulator 16, these figures also depict a first pivot pin 19 and a second pivot pin 20. The first pivot pin 19 couples the nose end 17 of the articulator 16 to the nose piece 14. The second pivot pin 20 couples the bridge end 18 of the articulator to the bridge piece 15.

Specifically, in FIG. 3C, FIG. 3D, and FIG. 3E depict the wearer 6 having a large nose 7 and eyes 8 set back deep in the head, away from the nose. In FIG. 3C, the articulated nose bridge 13 has been adjusted to position the head mounted display 10 at eye level on the wearer's face, and to tilt the head mounted display to an angle at which the front of the eye display 11 is perpendicular to the wearer's line of sight 9. In FIG. 3D, the articulated nose bridge 13 has been adjusted to position the head mounted display 10 low on the wearer's face, and to tilt the head mounted display to an angle at which the front of the eye display 11 is perpendicular to the wearer's line of sight 9. In FIG. 3E, the articulated nose bridge 13 has been adjusted to position the head mounted display 10 high on the wearer's face, and to tilt the head mounted display to an angle at which the front of the eye display 11 is perpendicular to the wearer's line of sight 9.

FIGS. 3F through 3H depict the wearer 6 having a smaller nose 7 and eyes 8 that are closer to the nose 7 indicating a flat face. In FIG. 3F, the articulated nose bridge 13 has been adjusted to position the head mounted display 10 at eye level on the wearer's face, and to tilt the head mounted display to an angle at which the front of the eye display 11 is perpendicular to the wearer's line of sight 9. In FIG. 3G, the articulated nose bridge 13 has been adjusted to position the head mounted display 10 low on the wearer's face, and to tilt the head mounted display to an angle at which the front of the eye display 11 is perpendicular to the wearer's line of sight 9. In each example depicted in FIG. 3C through FIG. 3G, the ability of the articulated nose bridge 13 according to the invention to adjust to a number of facial positions while keeping the eye display 11 perpendicular to the line of sight 9 on a variety of facial shapes has been shown. The examples also show that the articulated nose bridge 13 can be adjusted to keep the eye display 11 at a constant distance D from the wearer's eye 8.

FIG. 3H is similar to FIG. 3F inasmuch as the articulated nose bridge 13 has been adjusted to position the head mounted display 10 at eye level on the wearer's face, and to tilt the head mounted display to an angle at which the front of the eye display 11 is perpendicular to the wearer's line of sight 9. In FIG. 3H, however, the articulated nose bridge 13 has been adjusted to set the distance between the eye display 11 and the eye 8 to the smaller distance D1. This figure shows that the articulated nose bridge according to the invention can provide distance control in addition to height and tilt control of the head mounted display.

The articulated nose bridge 13 may be held in each of the positions shown in FIGS. 3A through 3H or in any intermediate position by friction or by a locking mechanism, described in detail below. While each of the embodiments of the articulated nose bridge 13 described below includes a locking mechanism 22, it is understood that each embodiment may be altered so that friction holds the articulated nose bridge 13 in its adjusted position.

Figure 4A:
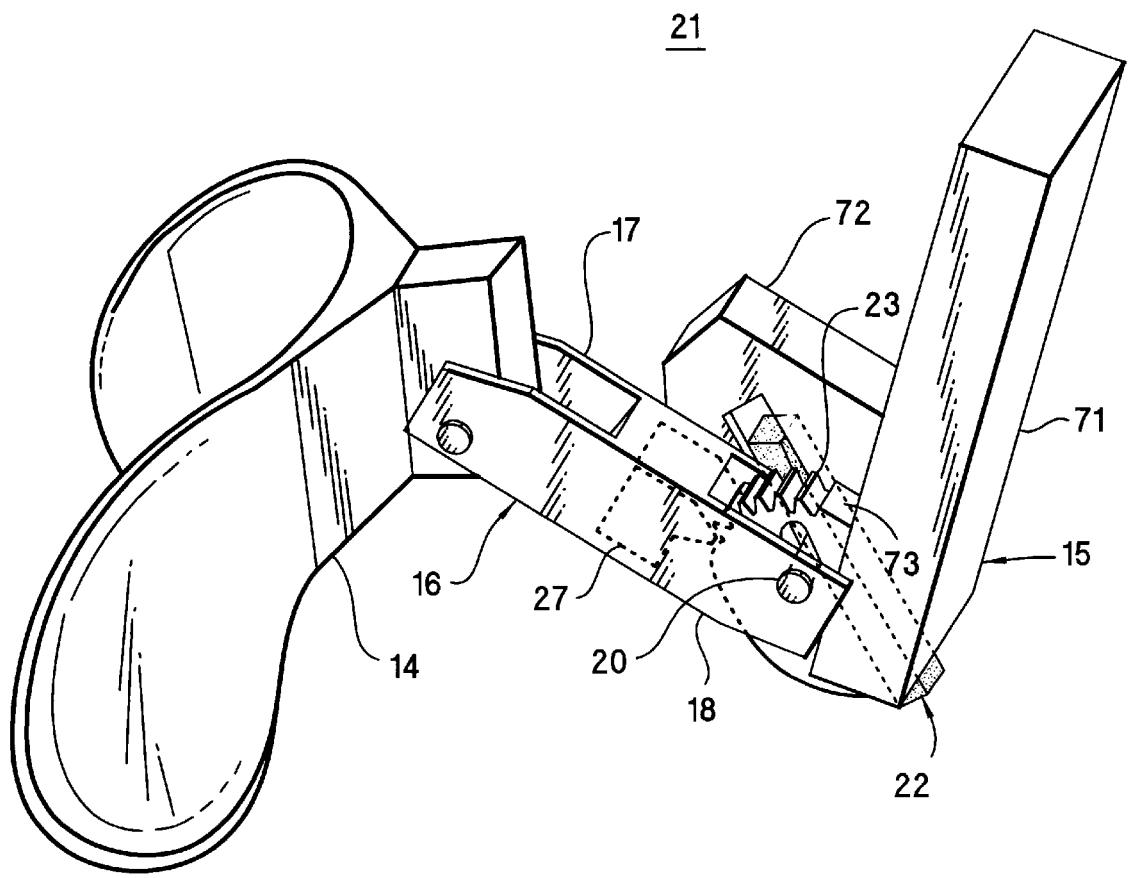
FIG. 4A is a perspective view of the first embodiment of the articulated nose bridge according to the invention.
Figure 4B:
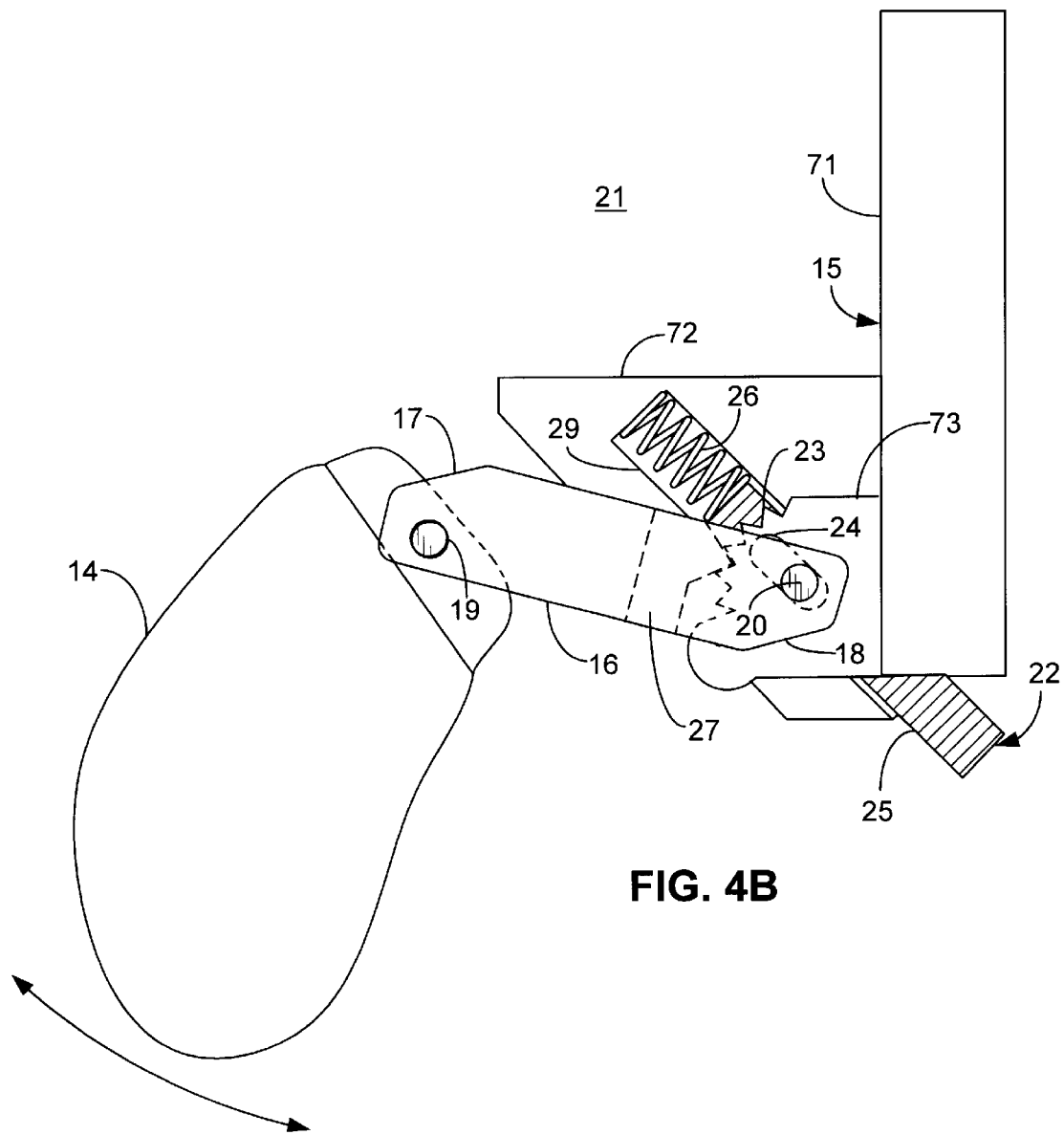
FIG. 4B is a side view of the first embodiment of an articulated nose bridge according to the invention with the locking mechanism in a locked position.
Figure 4C:
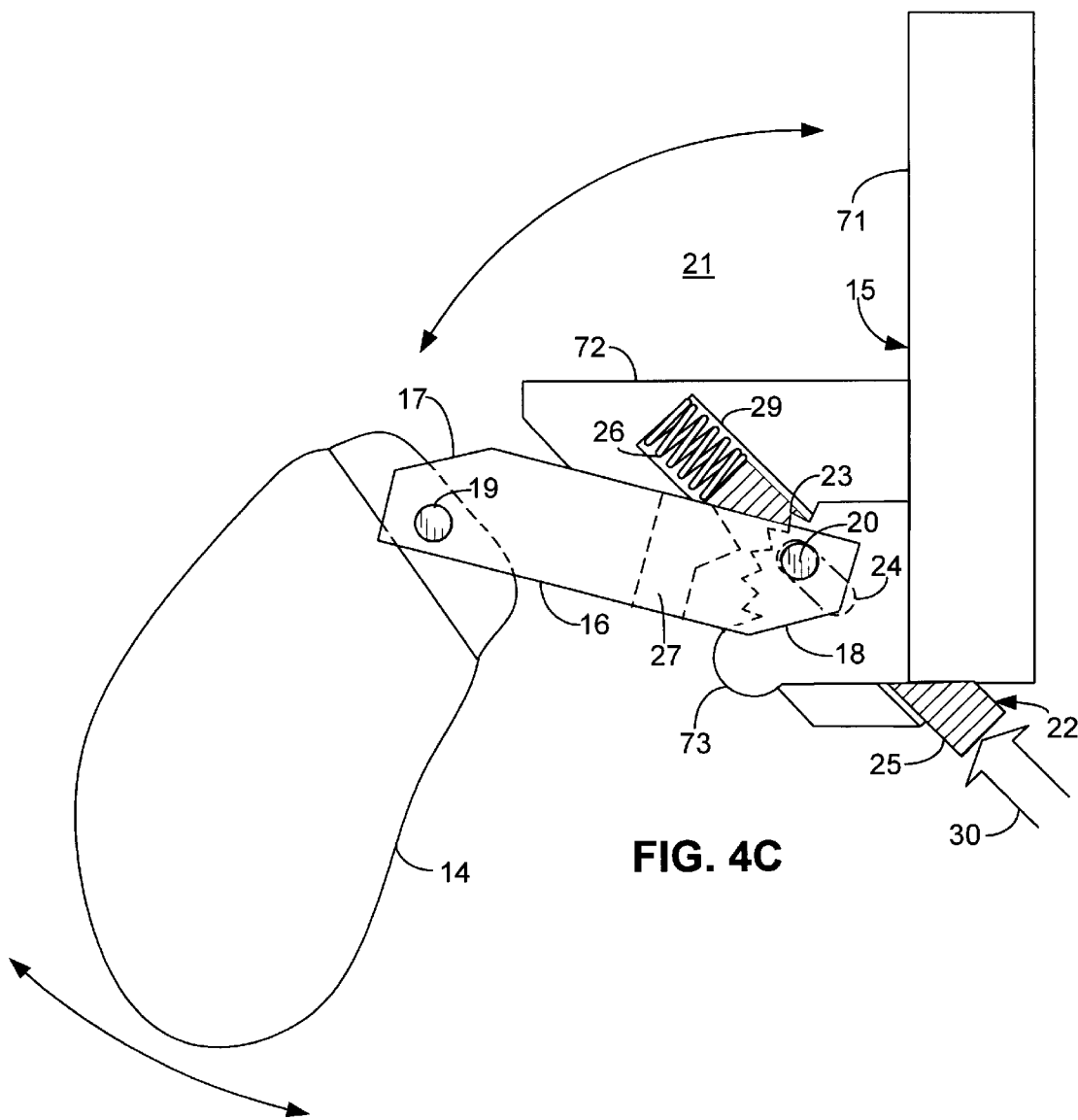
FIG. 4C is a side view of the first embodiment of an articulated nose bridge according to FIG. 4B with the locking mechanism in a free position.
Figure 4D:
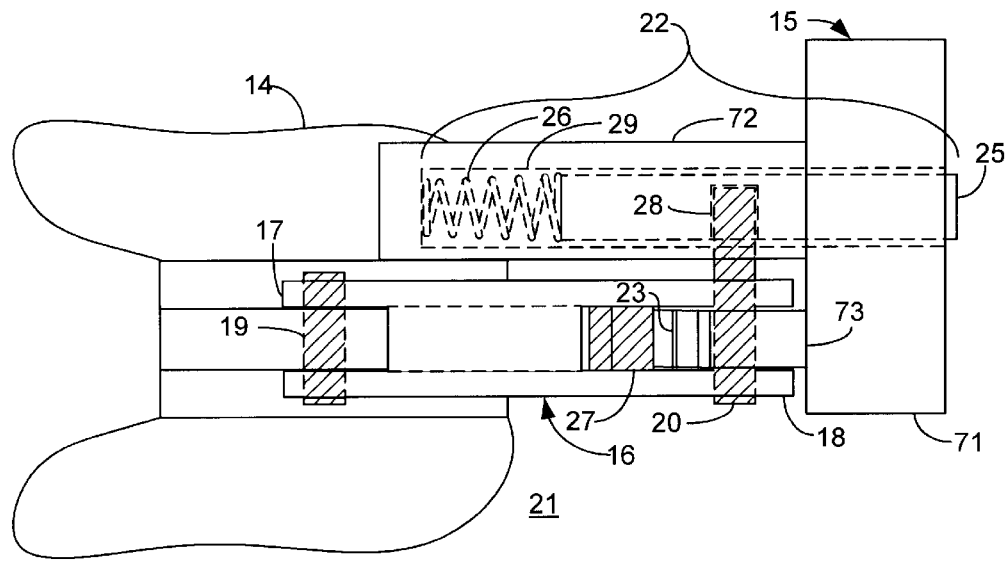
FIG. 4D is a plan view of the first embodiment depicted in FIG. 4B.
Figure 4E:
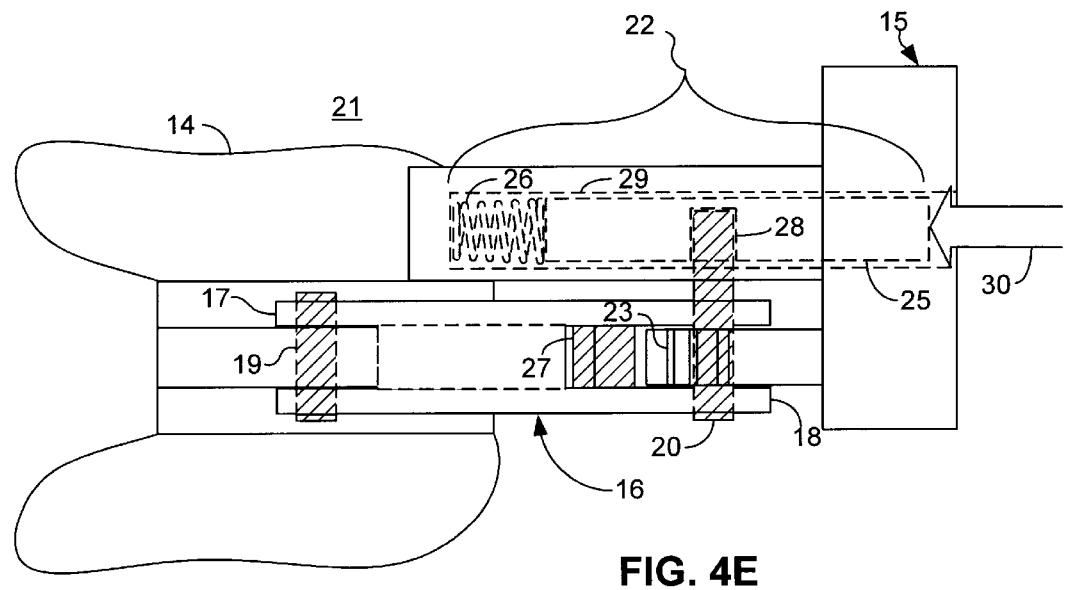
FIG. 4E is a plan view of the first embodiment depicted in FIG. 4C.
Figure 4F:
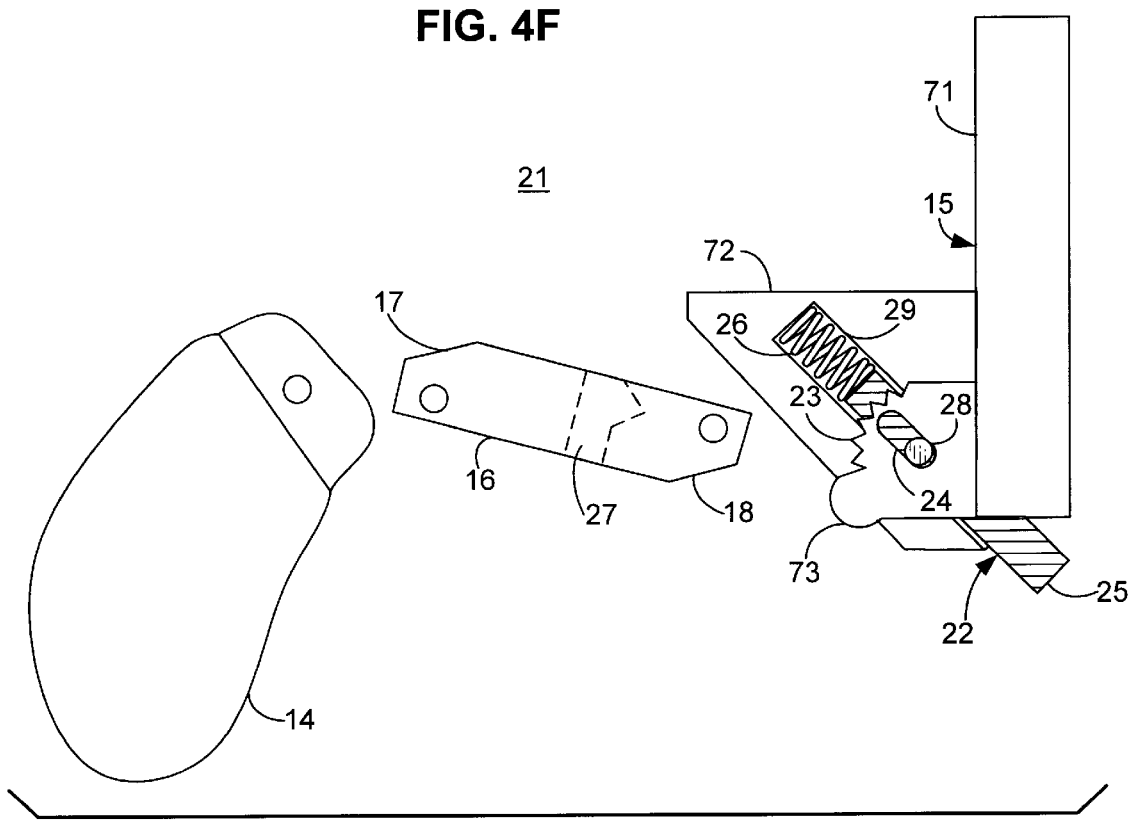
FIG. 4F is an exploded view of the first embodiment depicted in FIG. 4B and FIG. 4C.

FIG. 4A through FIG. 4G show a first embodiment 21 of the articulated nose bridge according to the invention. Specifically, FIG. 4A depicts a perspective view of the first embodiment of the articulated nose bridge. FIG. 4B and FIG. 4C depict a side view of the first embodiment 21 of the articulated nose bridge with a locking mechanism 22 in a locked position and a free position, respectively. FIG. 4D and FIG. 4E depict a plan view of the first embodiment 21 of the articulated nose bridge depicted in FIG. 4B and FIG. 4C, respectively. FIG. 4F is an exploded view of the first embodiment 21 of the articulated nose bridge, and FIG. 4G is an exploded view of a portion of the locking mechanism 22.

The first embodiment 21 of the articulated nose bridge has a simplified, single beam articulator structure as opposed to the two segment structure of the second embodiment 31, depicted in FIG. 3A through FIG. 3H and discussed in detail below. The simplified structure reduces manufacturing and assembly costs of the first embodiment 21 while retains the ability to adjust the height and tilt of the head mounted display 10 on the wearer's face. It is noted, however, that the first embodiment 21 of the articulated nose bridge lacks the ability found the other embodiments to adjust the distance between the eye displays 11, 70 and the wearer's eyes 8 (shown in FIG. 3A).

Referring additionally to FIG. 3A, the first embodiment 21 of the articulated nose bridge includes the nose piece 14 configured to rest on a wearer's nose 7, the bridge piece 15 attached to or integral with the bridge 12 located between the left and right eye displays 11, 70, and the articulator 16. The bridge piece 15 includes a main body 71, a locking mechanism housing 72 projecting from the main body and a pivot body 73 projecting from the main body. The pivot body 73 defines a slot 24 through the pivot body. In addition, the pivot body includes a gear segment 23 remote from the main body 71. The gear segment has an outer circumference 74 (shown in FIG. 4G).

The articulator 16, which preferably has a "U"-shaped cross-section and is made from folded sheet metal, has a nose end 17 coupled to the nose piece 14 by a first pivot pin 19 and a bridge end 18 pivotally coupled to the bridge piece 15 by a second pivot pin 20. The first pivot pin 19 and second pivot pin 20 are shown in black in FIG. 4B and FIG. 4C and with hash marks in FIG. 4D and FIG. 4E for clarity. The first pivot pin is preferably configured such that the wearer can pivot nose piece 14 about the first pivot pin 19 and the nose piece will remain in the adjusted position due to friction.

The first embodiment 21 of the articulated nose bridge additionally includes a locking mechanism 22. The locking mechanism includes a push button 25 (shown with hash marks for clarity in FIG. 4B, FIG. 4C, and FIG. 4F), spring 26, and pawl 27 (shown with hash marks for clarity in FIG. 4D and FIG. 4E). The spring 26 is preferably a compression spring. Defined in the push button 25 is a hole 28 dimensioned to receive the second pivot pin 20 (see FIG. 4D and FIG. 4E). The push button 25 and spring 26 fit into a channel 29 formed in the locking mechanism housing 72. The channel 29 is parallel to slot 24 defined in the pivot body 73. The channel is configured such that when the push button is in channel 29, the second pivot pin 20 can pass through slot 24 and into hole 28.

The pawl 27 is affixed to the articulator 16 and is configured to engage with the gear segment 23 when the locking mechanism 22 is in the locked position. For purposes of this description, a pawl is "engaged" with a gear segment when a portion of the pawl is located within the outer circumference of the gear segment. For example, pawl 27 is engaged with gear segment 23 because it is disposed within the outer circumference 74 of gear segment 23. When the pawl 27 is engaged with the gear segment 23, the pawl prevents the bridge piece 15 from pivoting around the second pivot pin 20. While backlash between the pawl and the gear segment may result in some trivial pivoting of the bridge piece around the second pivot pin 20, for purposes of this description, such pivoting is not considered "pivoting."

Except when the wearer presses the push button 25, the spring 26 moves the push button axially along the channel 29 in a first direction opposite that indicated by arrow 30 in FIG. 4C and FIG. 4E. The push button 25 moves the second pivot pin 20 in the first direction along a length of slot 24 and pulls the articulator 16 closer to the gear segment 23 until the pawl 27 is engaged with gear segment. This condition is called the locked position of the locking mechanism 22 and is depicted in FIG. 4A, FIG. 4B, and FIG. 4D. As noted above, when in the locked position the locking mechanism prevents the bridge piece 15 from substantially pivoting around the second pivot pin 20.

The wearer depressing the push button 25, as indicated by the arrow 30 in FIG. 4C and FIG. 4E, compresses the spring 26 and moves the push button toward the spring. This moves the second pivot pin 20 along slot 24 and pushes the articulator 16 away from the pivot body 73. The second pivot pin continues to move with the slot 24 until the second pivot pin 20 has reached the end of the slot 24 remote from the main body 71 and the pawl 27 is disengaged from the gear segment 23. This condition is called the free position of the locking mechanism 22. When the locking mechanism is in the free position, the bridge piece 15 is free to pivot around the second pivot pin 20.

Preferably, the spring 26, gear teeth 23, pawl 27 are configured to require the wearer to push the push button 25 to move the locking mechanism 22 into the free position. Certain spring, gear teeth, and pawl configurations, however, will allow the locking mechanism 22 to operate like a detent system. Thus, when the wearer pivots the bridge piece 15 about second pivot pin 20, the force required to pivot the bridge piece also overcomes the force exerted by the spring 26 allows the pawl to slide up the adjacent gear tooth of the gear segment 23 until it disengages from the gear segment. When the wearer stops pivoting the bridge piece, the spring 26 forces the pawl back into engagement with the gear segment 23, thus moving the locking mechanism back into the locked position.

In addition, while in each of the embodiments of the invention it is preferred that the first pivot pin 19 pivotally couple the nose piece 14 to the articulator 16 to provide the wearer with the ability to adjust the angle of the nose piece 14 to the most comfortable angle, it is possible to couple the nose piece rigidly or elastically to the articulator in some other way.

Figure 5A:
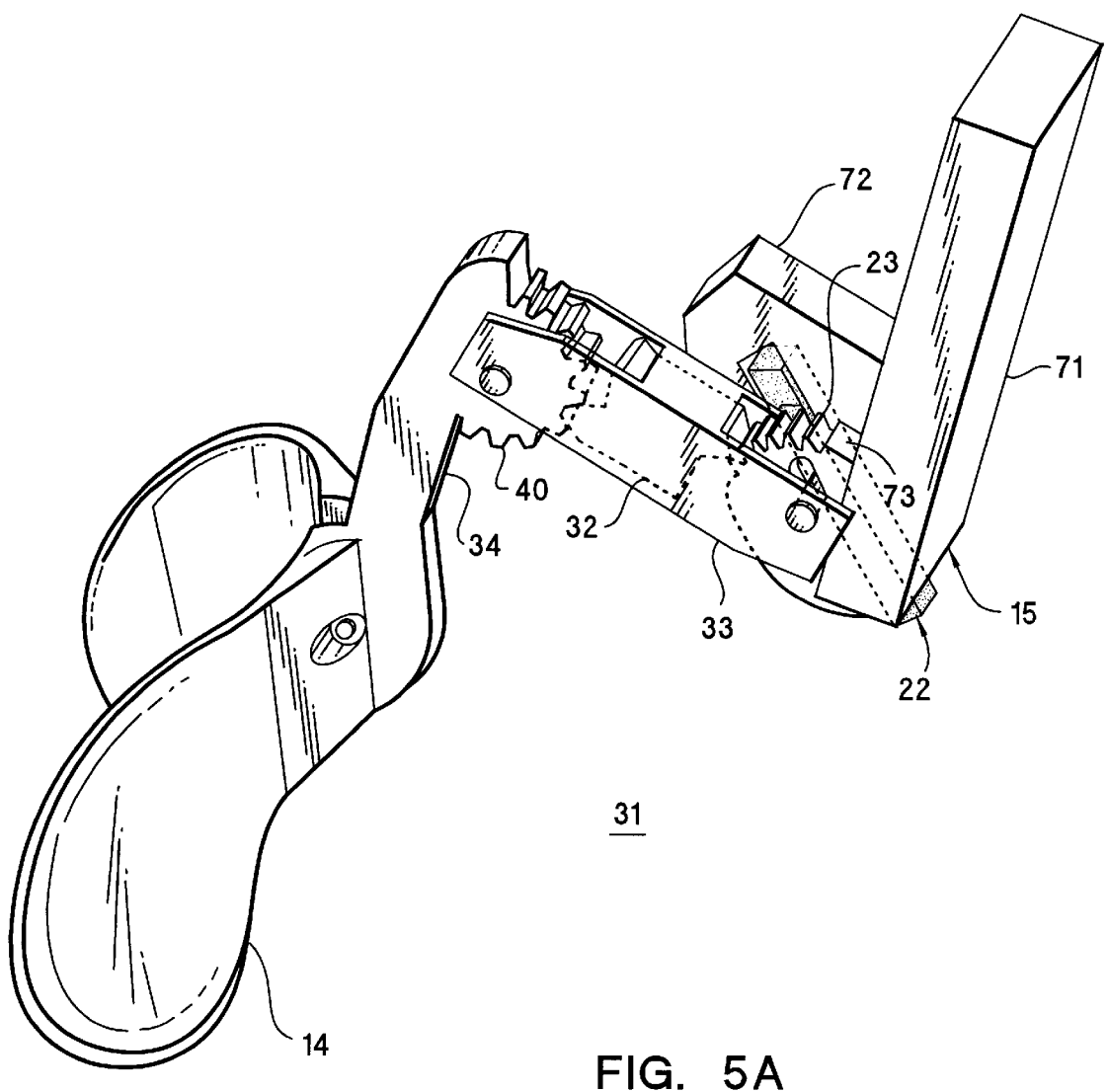
FIG. 5A is a perspective view of the second embodiment of the articulated nose bridge according to the invention.
Figure 5B:
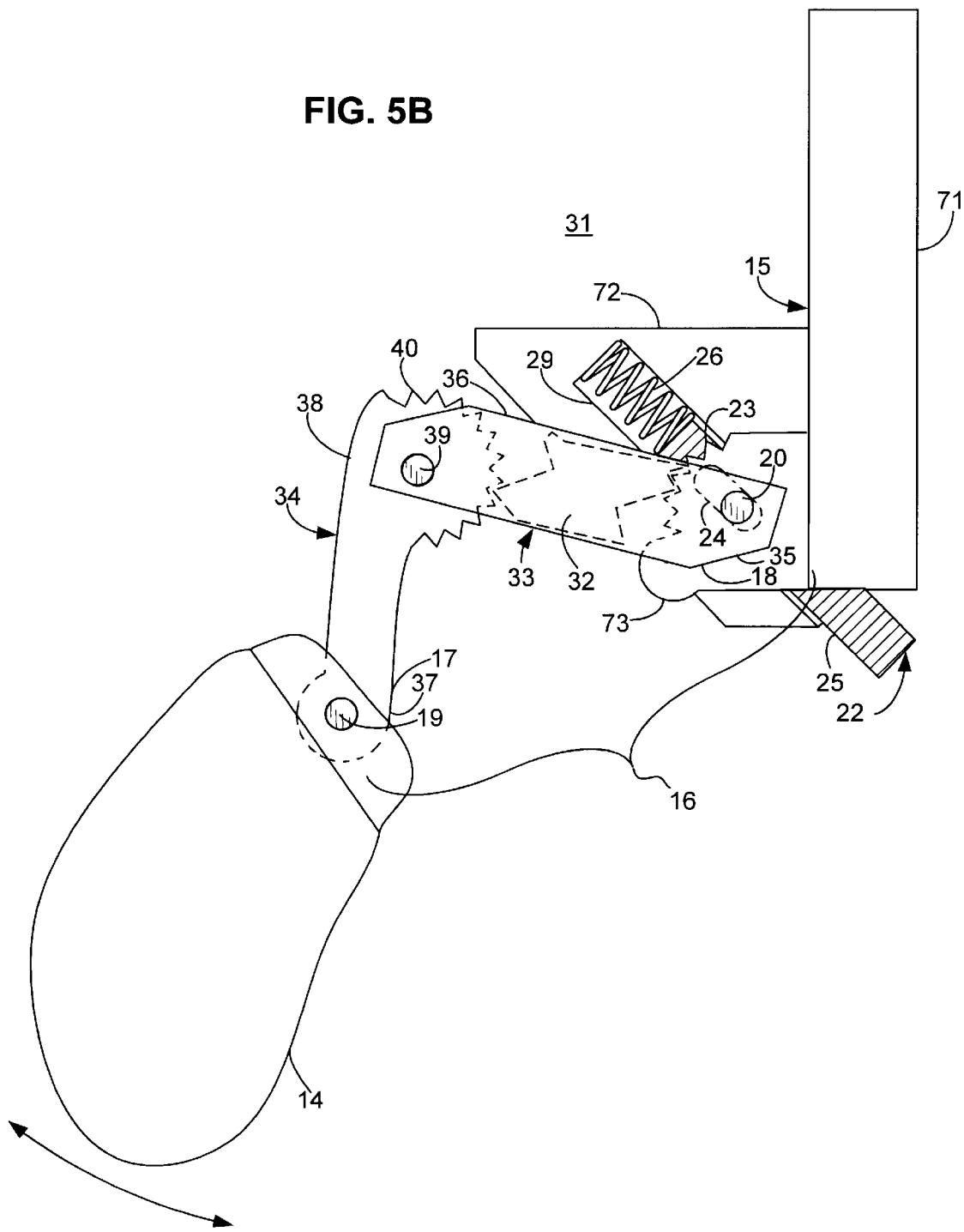
FIG. 5B is a side view of the second embodiment of the articulated nose bridge according to the invention with the locking mechanism in a locked position.
Figure 5D:
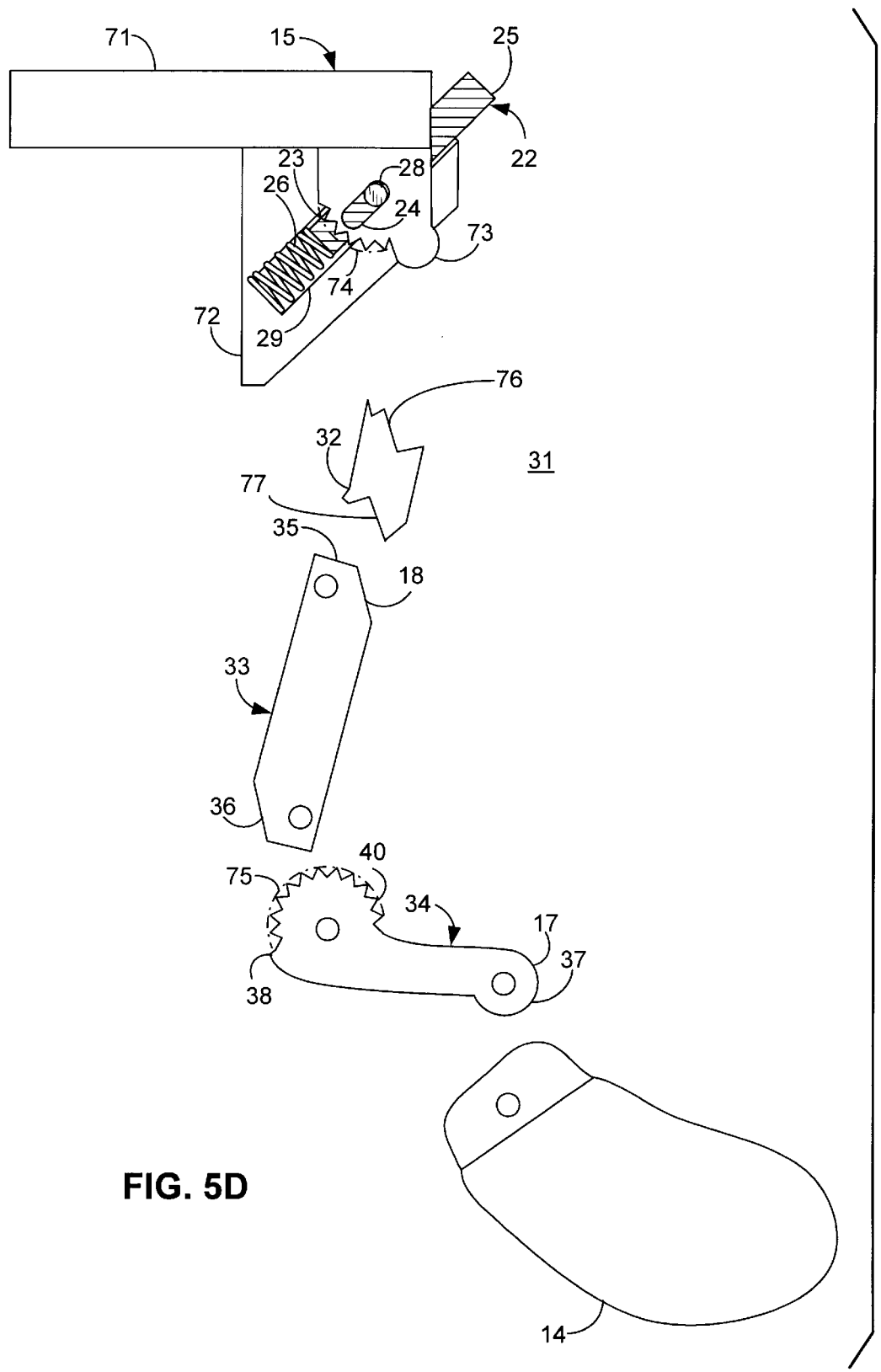
FIG. 5D is an exploded view of the second embodiment of the invention as depicted in FIG. 5A, FIG. 5B, and FIG. 5C.

FIG. 5A through FIG. 5D show a second embodiment 31 of the articulated nose bridge according to the invention. Specifically, FIG. 5A depicts a perspective view of the second embodiment 31 of the articulated nose bridge according to the invention. FIG. 5B and FIG. 5C depict a side view of the second embodiment 31 of the articulated nose bridge with a locking mechanism 22 in a locked position and an free position, respectively. Finally, FIG. 5D is an exploded view of the second embodiment 31 of the articulated nose bridge.

The second embodiment 31 of the articulated nose bridge is structurally similar to the first embodiment 21 discussed above. To the extent that elements of the second embodiment are identical to the elements of the first embodiment 21, previously described and depicted in FIG. 4A though FIG. 4G, they will be indicated with identical reference numerals in FIGS. 5A though 5D, and will not be described again below.

One significant difference between the first embodiment 21 and the second embodiment 31 of the invention is found in the articulator 16. In the second embodiment, the articulator 16 includes a bridge segment 33 and a nose segment 34. The bridge segment 33 has a first end 35 that includes the bridge end 18 of the articulator and a second end 36. The bridge segment preferably is made of sheet metal and has a "U"-shaped cross-section at the first end 35 and second end 36 and a box cross-section between the first end and the second end. The nose segment 34 has a third end 37 that includes the nose end 17 of the articulator and a fourth end 38. The fourth end 38 of the nose segment 34 is pivotally coupled to the second end 36 of the bridge segment 33 with a third pivot pin 39.

A second significant difference between second embodiment 31 and the first embodiment 21 is pawl 32. Like the pawl 27 of the first embodiment, the pawl 32 is configured to engage the gear segment 23 (also called "first gear segment" below) formed in pivot body 73 when the locking mechanism is in the locked position. The pawl 32, when engaged with the first gear segment 23, prevents the bridge piece 15 from substantially pivoting around the second pivot pin 20. Unlike the pawl 27 of the first embodiment 21, however, pawl 32 of the second embodiment 31 is not affixed to the articulator 16, but is instead constrained within the box cross-section of the bridge segment 34 of the articulator, such that it is free to move axially within the bridge segment. The pawl 32 preferably has a rectangular cross section that fits within the box cross-section of the bridge segment 34 and has a first engaging portion 76 and second engaging portion 77 (shown in FIG. 5D). The first engaging portion 76 is the portion of the pawl that is configured to engage the first gear segment 23 when the locking mechanism 22 is in the locked position as described above. The second engaging portion 77 of the pawl 32 is configured to engage a second gear segment 40 when the locking mechanism is in the locked position. The second gear segment will be described below.

In addition to keeping the bridge piece 15 from pivoting when in the locked position, the locking mechanism 22 of the second embodiment 31 when in the locked position also prevents the nose segment 34 from pivoting about the third pivot pin 39 in the second end 36 of the bridge segment 33. To prevent the nose segment from pivoting, the second gear segment 40 is formed in fourth end 38 of the nose segment 34. When the locking mechanism is in the locked position, the first engaging portion 76 of the pawl 32 engages the first gear segment 23 and the second engaging portion 77 of the pawl engages the second gear segment 40. The pawl 32 thus prevents both the nose segment from pivoting about the third pivot pin 39 and prevents the bridge piece 15 from pivoting about the second pivot pin 20.

Except when the wearer presses the push button 25, the spring 26 moves the push button along the channel 29 in the first direction, opposite the direction of the arrow 30. The push button 25 moves the second pivot pin 20 in the first direction along slot 24. The second pivot pin pulls the bridge segment 33 of the articulator 16 closer to the pivot body 73, and moves the second gear segment 40 closer to the first gear segment 23. The bridge segment moves closer to the pivot body until the pawl 32 is engaged with both the first gear segment 23 and the second gear segment 40. This condition is called the locked position of the locking mechanism 22 and is depicted in FIG. 5A and FIG. 5B.

When the wearer depresses the push button 25, as indicated by the arrow 30 in FIG. 5C, the push button compresses the spring 26 and moves toward the spring. This moves the second pivot pin 20 along slot 24 and pushes the bridge segment 33 of the articulator 16 away from the pivot body 73. The bridge segment moving away from the pivot body moves the second gear segment 40 away from the first gear segment 23. The second pivot pin 20 continues to move within the slot 24 until the second pivot pin 20 has reached the end of the slot 24 removed from the main body 71 of the bridge piece 15 and the pawl 32 is disengaged from the second gear segment 40 and the first gear segment 23. This condition is called the free position of the locking mechanism 22. When the locking mechanism 22 is in the free position, the bridge piece 15 is free to pivot around the second pivot pin 20 and the nose segment 34 is free to pivot around the third pivot pin 39.

Preferably, the spring 26, the first gear segment 23, the second gear segment 40, and the pawl 27 are configured to require the wearer to depress the push button 25 to move the locking mechanism into the free position. However, certain spring, first gear segment, second gear segment, and pawl configurations will allow the locking mechanism 22 to operate like a detent system. Thus, when the wearer pivots the bridge piece 15 about second pivot pin 20 or pivots the nose segment 34 about the third pivot pin 39, the force required to pivot the bridge piece or nose segment overcomes the force of spring 26 and allows the pawl to slide up the side of an adjacent tooth of either the first gear segment 23 or the second gear segment 40 until it is no longer engaged. When the wearer stops pivoting the bridge piece or the nose piece, the spring 26 moves the pawl back into engagement with both the first gear segment 23 and the second gear segment 40, thus moving the locking mechanism back into the locked position.

Figure 6A:
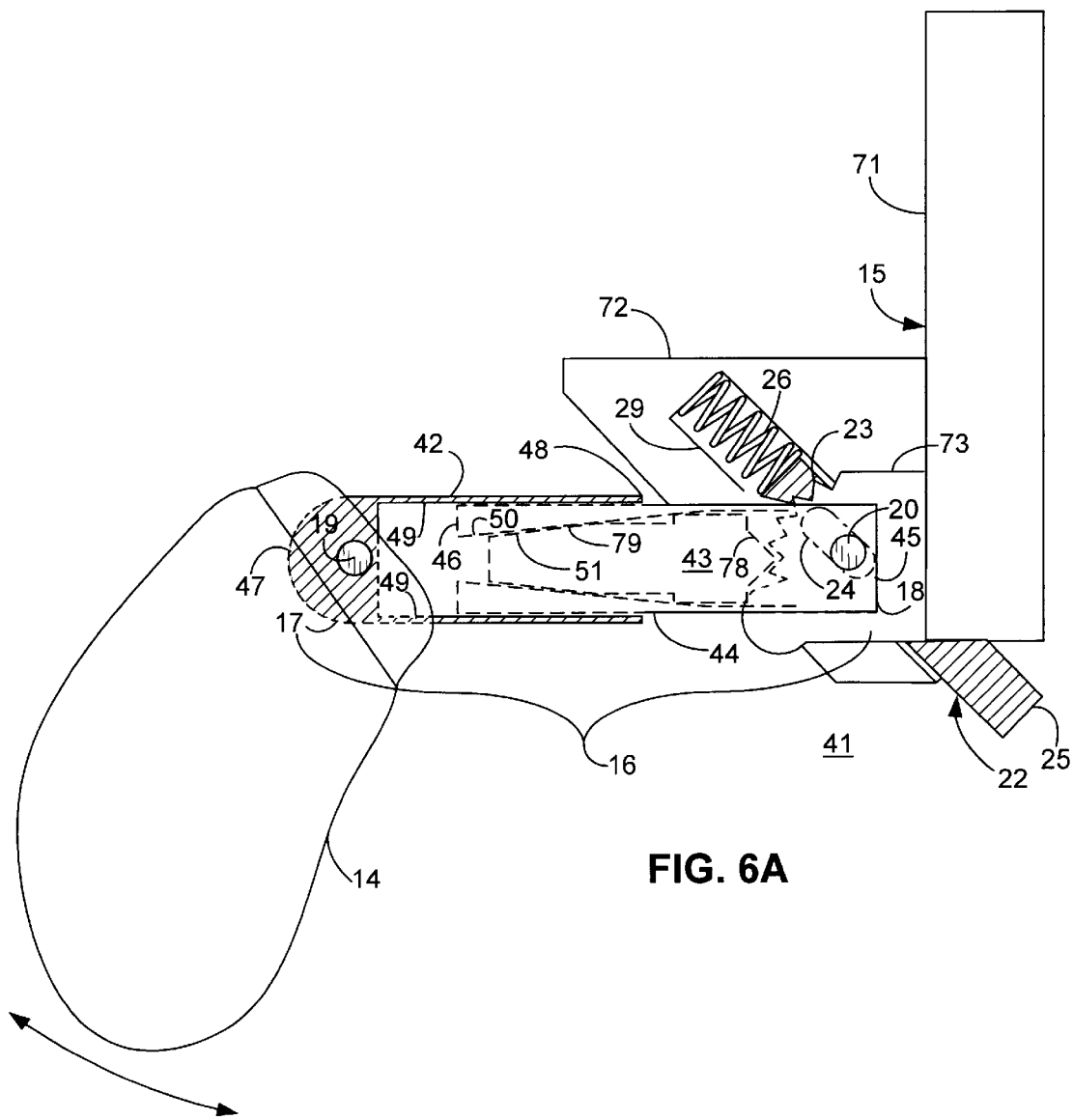
FIG. 6A is a side view of the third embodiment of an articulated nose bridge according to the invention with the locking mechanism in the locked position.

FIG. 6A through FIG. 6C show a third embodiment 41 of the articulated nose bridge according to the invention. Specifically, FIG. 6A depicts a side view of the third embodiment 41 of the articulated nose bridge with a locking mechanism 22 in a locked position. FIG. 6B and FIG. 6C depict the third embodiment of the articulated nose bridge according to the invention with the locking mechanism 22 in a free position and the nose segment 42 extended and retracted, respectively.

The third embodiment 41 of the articulated nose bridge is structurally similar to the first and second embodiments 21, 31 discussed above except for the articulator 16 and the pawl 43. To the extent that elements of the third embodiment are identical to the elements of the first two embodiments 21, 22 previously described and depicted in FIG. 4A though FIG. 5D, they will be indicated with identical reference numerals in FIGS. 6A though 5C, and will not be described again below.

The pawl 43 in the third embodiment, however, is different than the pawl 27 of the first embodiment 21 and the pawl 32 of the second embodiment. Like the pawl of the second embodiment, the pawl 43 has a first engaging portion 78 configured to engage the first gear segment 23 when the locking mechanism is in the locked position and is free to move in one dimension within the bridge segment 44 of the articulator 16. When the pawl 43 is engaged with the gear segment 23, the pawl 43 prevents bridge piece 15 from pivoting around the second pivot pin 20. The pawl 43 is also has an extended body portion 79 configured to prevent longitudinal movement within the articulator 16 when the locking mechanism is in the locked position as will be discussed in detail, below.

In the third embodiment 41, the articulator 16 includes a bridge segment 44 and a nose segment 42. The bridge segment 44 has a first end 45 including the bridge end 18 of the articulator and a second end 46. The bridge segment 44 is preferably made from folded sheet metal and has a "U"-shaped cross-section at the first end 45 and a box-shaped cross section at the second end 46 that constrains the pawl 43. The nose segment 42 has a third end 47 that includes the nose end 17 of the articulator and a fourth end 48 configured to slip over a portion of the bridge segment 44 from the second end 46. Bridge segment 44 is slipped into the nose segment 42 (longitudinal movement) to a varying degree, controlling the overall length of the articulator 16.

In addition to keeping the bridge piece 15 from pivoting when in the locked position, the locking mechanism 22 of the third embodiment 41 when in the locked position also prevents the bridge segment 44 from moving longitudinally within the nose section 42 when the locking mechanism is in the locked position. Thus, the locking mechanism prevents the length of the articulator from changing while in the locked position. The second end 46 of the bridge segment 44 is configured to expand against at least one internal surface 49 of the nose segment 42 when internal pressure is applied to the second end 46 of the bridge segment 44. Preferably, the second end 46 includes ramps 50 that expand the second end against the at least one internal surface 49 of the nose segment 42 when an internal pressure is applied.

To supply the internal pressure necessary to prevent the bridge segment 44 from moving longitudinally within the nose segment 42, the extended body portion 79 of pawl 43 is formed into a wedge 51. The wedge 51 is configured to apply the internal pressure to the second end 46 when the locking mechanism is in the locked position by forcing the ramps 50 toward the at least one internal surface 49 of the nose segment 42. Thus, when the locking mechanism is in the locked position, the first engaging portion 78 of pawl 43 engages with the gear segment 23 and, the wedge 51 moves the ramps toward the at least one inner surface 49 of the nose segment. The locking mechanism thus prevents both longitudinal movement of the bridge segment 44 within the nose segment 42 and prevents the bridge piece 15 from pivoting about the second pivot pin 20.

Except when the wearer presses the push button 25, the spring 26 moves the push button along the channel 29 in a direction opposite that of the arrow 30 in FIG. 6B and FIG. 6C. The push button 25 moves the second pivot pin 20 along slot 24. The second pivot pin 20 pulls the bridge segment 44 of the articulator 16 closer to the pivot body 73, and moves ramps 50 closer to the gear segment 23. The bridge segment moves closer to the pivot body 73 until the pawl 43 engages with the gear segment 23 and the wedge 52 has pushed the ramps 50 toward the internal surface 49 of the nose segment 43. This condition is called the locked position of the locking mechanism 22 and is depicted in FIG. 6A.

When the wearer depresses push button 25, as indicated by the arrow 30 in FIG. 6B and FIG. 6C, the spring 26 is compressed and the push button moves toward the spring. The push button 25 moves the second pivot pin 20 along slot 24. The second pivot pin 20 pushes the bridge segment 44 of the articulator 16 away from the pivot body 73, moving the ramps 50 away from the gear segment 23. This movement progresses until the second pivot pin 20 has reached the end of the slot 24 remote from the main body 71, the pawl 32 disengages from the gear teeth 23, and the wedge 51 no longer applies internal pressure to the second end 46 of the bridge segment 44. This condition is called the free position of the locking mechanism 22. When the locking mechanism 22 is in the free position, the bridge piece 15 is free to pivot around the second pivot pin 20, and the nose segment 43 is free to move longitudinally between the extended position depicted in FIG. 6B and the retracted position depicted in FIG. 6C.

Figure 7A:
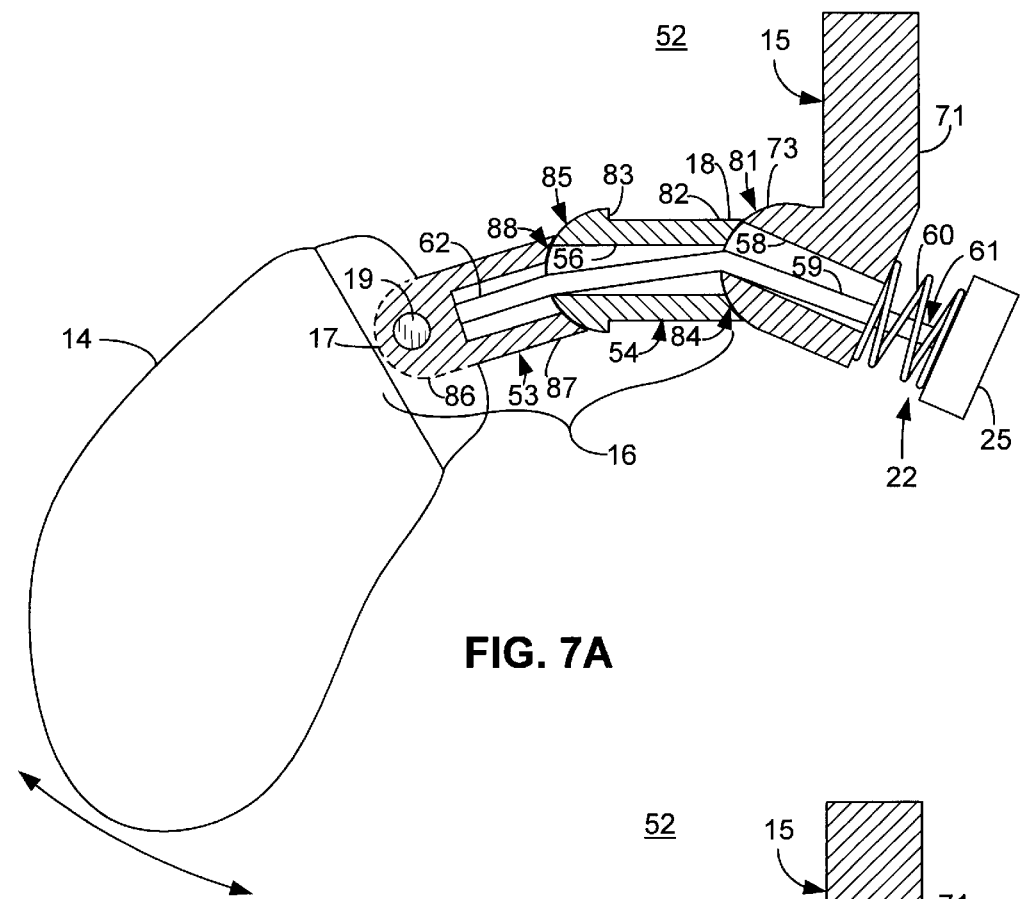
FIG. 7A is a side view of the fourth embodiment of an articulated nose bridge according to the invention with the locking mechanism in the locked position.
Figure 7B:
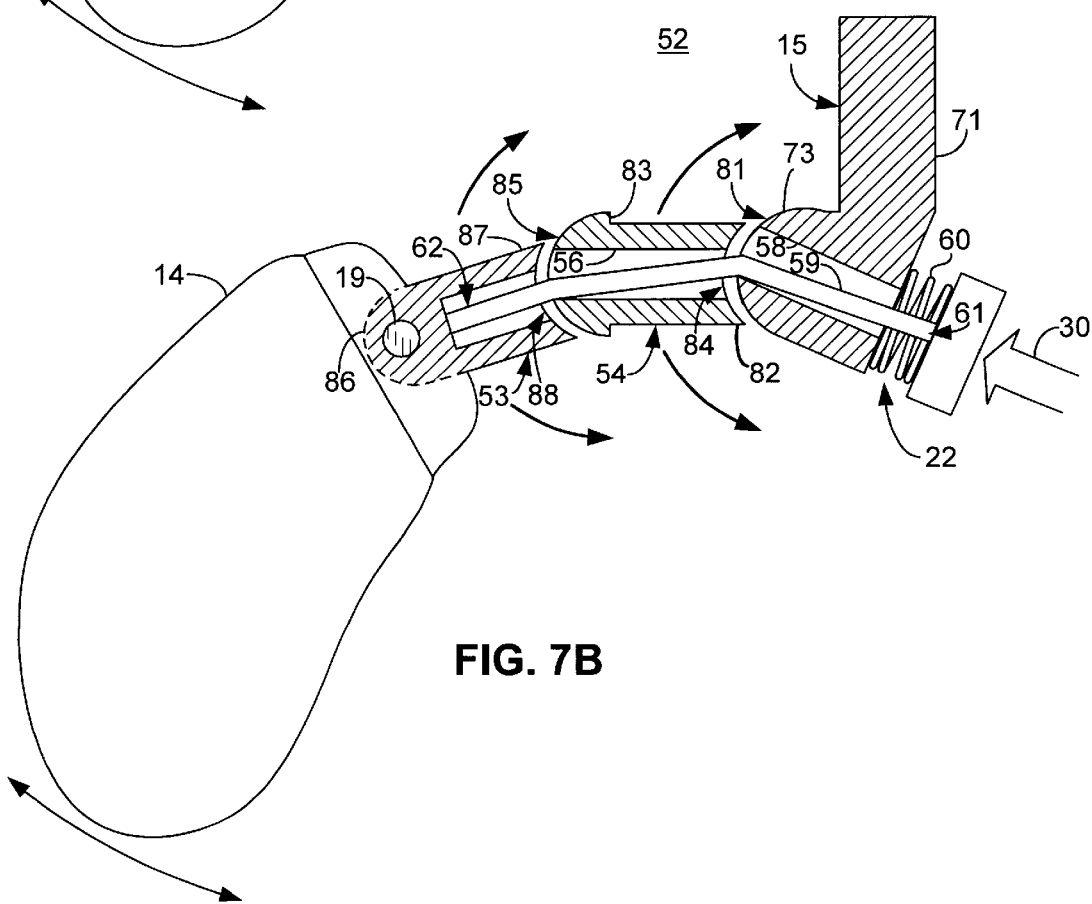
FIG. 7B is a side view of the fourth embodiment of the articulated nose bridge according to the invention with the locking mechanism in the free position.

FIG. 7A and FIG. 7B show a fourth embodiment 52 of the articulated nose bridge according to the invention. Specifically, FIG. 7A depicts a side view of the fourth embodiment 52 of the articulated nose bridge with the locking mechanism 22 in a locked position. FIG. 7B depicts a side view of the fourth embodiment 52 of the articulated nose bridge with the locking mechanism a free position.

The fourth embodiment 52 of the articulated nose bridge is structurally similar to the previously described second embodiment 31. To the extent that elements of the fourth embodiment are identical to the elements of the second embodiment 31, previously described and depicted in FIG. 5A though FIG. 5D, they will be indicated with identical reference numerals in FIG. 7A and FIG. 7B, and will not be described again below.

In the fourth embodiment 52, the bridge piece 15 includes the main body 71 and the pivot body 73. The pivot body preferably defines a first curved face 81 remote from the main body 71 and defines a first through hole 58 passing through the pivot body 73 from the first curved face 81.

The articulator 16 of the fourth embodiment 52 has a bridge segment 54 and a nose segment 53. The bridge segment 54 has a first end 82 including the bridge end 18 and a second end 83. The first end 82 preferably defines a second curved face 84 shaped to fit tightly against the first curved face 81 of the pivot body 73. The second end 83 preferably defines a third curved face 85. The bridge segment 54 additionally defines a second through hole 56 that passes from the second curved face 84 to the third curved face 85.

The nose segment 53 of the fourth embodiment has a third end 86 including the nose end 17 and a fourth end 87. The fourth end preferably defines a fourth curved face 88 shaped to fit tightly against the third curved face 85 of the bridge segment 54.

The pivot body 73 and the bridge segment 54 are preferably configured to prevent the first curved face 81 of the pivot body from sliding against the second curved face 84 of the bridge segment when the first curved face and the second curved face are pressed together tightly. Similarly, the bridge segment 54 and the nose segment 53 are preferably configured to prevent the third curved face 85 of the bridge segment 54 from sliding against the fourth curved face 88 of the nose segment 53 when the third curved face and the fourth curved face are pressed together tightly.

The locking mechanism 22 of the fourth embodiment 52 includes the push button 25, a cable 59 and a tensioner 60 that is preferably a compression spring. The cable has a first cable end 61 attached to the push button and a second cable end 62 attached to the nose segment 53. From the first cable end 61, the cable 59 passes through the tensioner 60, the first through hole 58 in the pivot body 73, and the second through hole 56 in the bridge segment 54.

Except when the wearer depresses the push button 25, the tensioner 60 moves the push button 25 and the first cable end 61 away from the bridge piece 15 in a direction opposite the arrow 30 in FIG. 7B. This moves the nose segment 53 and the second cable end 62 toward the first curved face 81 of the pivot body 73. The nose segment 53 continues to move toward the first curved face 81 until the bridge segment 54 is compressed between the nose segment 53 and the pivot body 73 with the first curved face 81 pressed tightly against the second curved face 84 and the third curved face 85 pressed tightly against the fourth curved face 88. This condition is called the locked position of the locking mechanism 22 and is depicted in FIG. 7A. In the locked position, the locking mechanism prevents the first curved face 81 from sliding against the second curved face 84 and thus prevents the bridge piece 15 from pivoting against the bridge segment 54. Additionally, in the locked position, the locking mechanism prevents the third curved face 85 from sliding against the fourth curved face 88 and thus prevents the nose segment 53 from pivoting against the bridge segment 54.

When the wearer depresses push button 25, as indicated by the arrow 30 in FIG. 7B, the push button 25 moves toward the bridge piece 15 and compresses the tensioner 60 between the push button and the bridge piece 15. This moves the first cable end 61 toward the bridge piece 15, which released the tension in the cable 59. The allows the second cable end 62 and the nose segment 53 to move away from the pivot body 73, thus separating and the nose segment from the bridge segment 54. Once the nose segment 53 moves away from the bridge segment 54, the bridge segment can move away from the pivot body 73 along the cable 59, thus separating the bridge segment and the pivot body. This condition is called the free position of the locking mechanism 22 and is depicted in FIG. 7B. In the free position, the cable 59 couples and aligns the nose segment 53, bridge segment 54, and the bridge piece 15, but the flexibility of the cable allows both the nose segment to pivot around the second end 83 of the bridge segment and the bridge piece 15 to pivot around the first end 82 of the bridge segment.

Figure 8A:
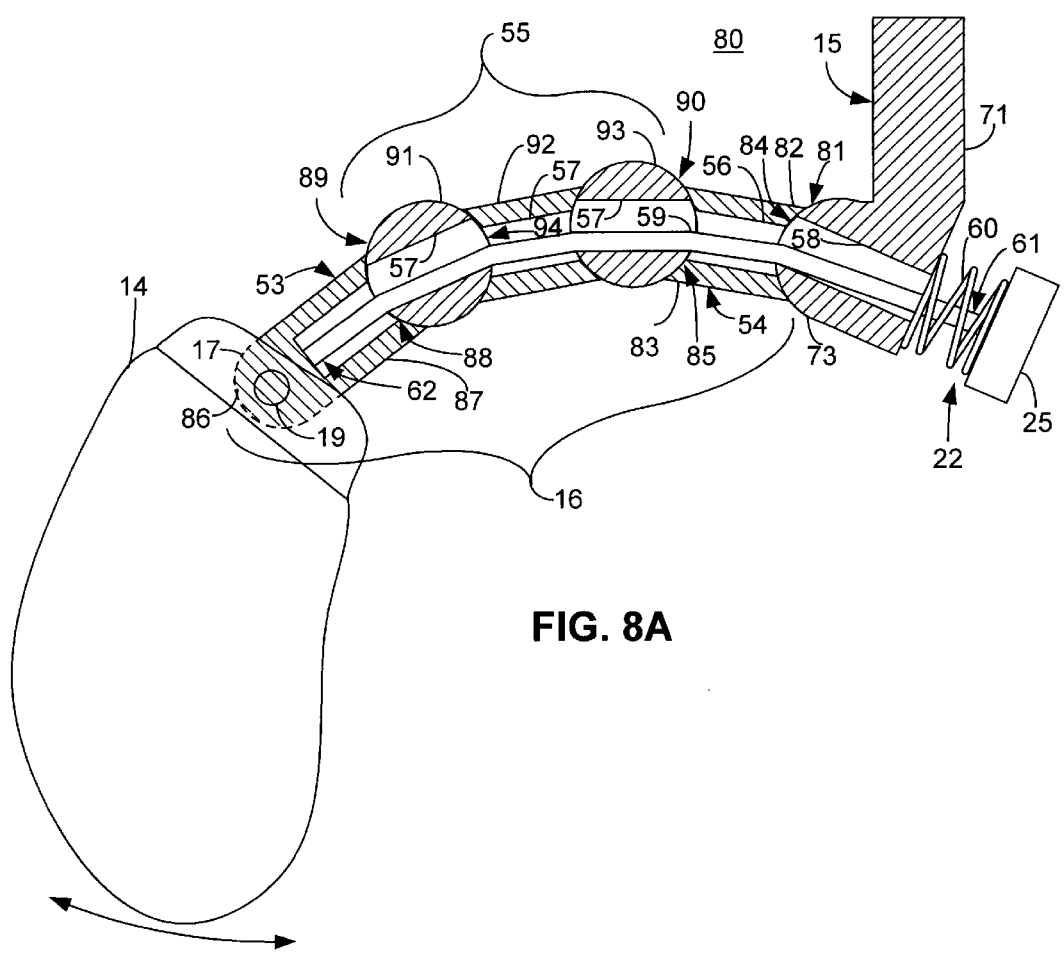
FIG. 8A is a side view of the fifth embodiment of an articulated nose bridge according to the invention with the locking mechanism in the locked position.
Figure 8B:
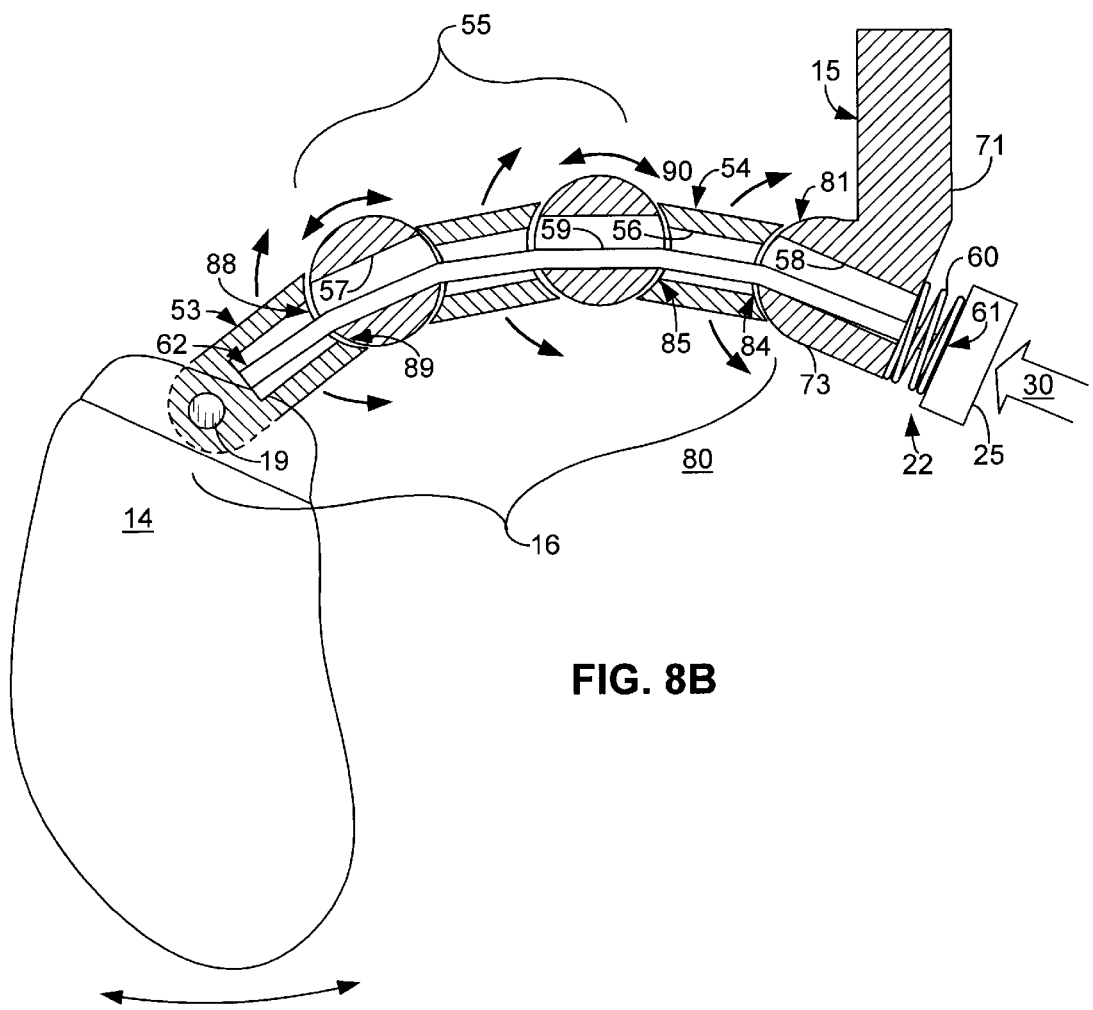
FIG. 8B is a side view of the fifth embodiment of an articulated nose bridge according to the invention with the locking mechanism in the free position.

Referring now to FIG. 8A and FIG. 8B, a fifth embodiment 80 of the articulated nose bridge according to the invention is depicted. Specifically, FIG. 8A depicts a side view of the fifth embodiment 80 of the articulated nose bridge with the locking mechanism 22 in a locked position. FIG. 8B depicts a side view of the fifth embodiment 80 of the articulated nose bridge with the locking mechanism 22 in a locked position. The fifth embodiment 80 of the articulated nose bridge is structurally similar to the previously described fourth embodiment 52. To the extent that elements of the fifth embodiment are identical to the elements of the fourth embodiment 53, previously described and depicted in FIG. 7A and FIG. 7B, they will be indicated with identical reference numerals in FIG. 8A and FIG. 8B, and will not be described again below.

The primary difference between the fourth embodiment 52 and the fifth embodiment 80 of the articulated nose bridge is the addition of an intermediate section 55 between the nose segment 53 and the bridge segment 54 of the articulator 16. The addition of the intermediate section 55 allows the articulator to have additional flexibility and provides a greater number of adjustment possibilities to the wearer.

The articulator 16 of the fifth embodiment 80 includes the nose segment 53, the bridge segment 54, and an intermediate section 55. The intermediate section 55 defines a nose curved face 89, a bridge curved face 90 and a third through hole 57 running from the nose curved face to the bridge curved face. The bridge curved face 90 is preferably shaped to fit tightly against the third curved face 85 of the bridge segment 54. The nose segment 53 of the fifth embodiment 80 differs from the nose segment of the fourth embodiment 53 inasmuch as the fourth curved face 88 in the fifth embodiment is shaped to fit tightly against nose curved face 89 rather than the third curved face 85.

The bridge segment 54 and the intermediate section 55 are preferably configured to prevent the third curved face 85 of the bridge segment 54 from sliding against the bridge curved face 90 of the intermediate section 55 when the third curved face and the bridge curved face are pressed together tightly. Similarly, the nose segment 53 and the intermediate section 55 are preferably configured to prevent the fourth curved face 88 of the nose segment 53 from sliding against the nose curved face 89 of the intermediate section 55 when the fourth curved segment and the nose curved segment are pressed together tightly.

The intermediate section 55 does not have to be a single body. It is preferred that the intermediate section 55 include a number (three are shown in FIG. 8A and FIG. 8B) of intermediate bodies 91, 92, 93, each intermediate body having a mating curved surface 94 configured to fit tightly against the mating curved surface of an adjacent intermediate body. The first intermediate body 91 is adjacent the nose section 53 and includes the nose curved face 89. The third intermediate body 93 is adjacent the bridge segment 54 and includes the bridge curved face 90. The second intermediate body 92 includes two mating curved surfaces 94. Preferably, every other intermediate body (first and third intermediate bodies 91, 93) have a cylindrical or spherical shape and are separated by an intermediate body 92 with two concave mating curved faces 94.

The locking mechanism 22 of the fifth embodiment 80 includes the push button 25, the cable 59 and the tensioner 60. The cable has a first cable end 61 attached to the push button and a second cable end 62 attached to the nose segment 53. From the first cable end 61, the cable 59 passes through the tensioner 60, the first through hole 58 in the pivot body 73, the second through hole 56 in the bridge segment 54, and the third through hole 57 in intermediate section 55.

Except when the wearer depresses the push button 25, the tensioner 60 moves the push button 25 and the first cable end 61 away from the bridge piece 15 in a direction opposite the arrow 30 in FIG. 8B. This moves the nose segment 53 and the second cable end 62 toward the first curved face 81 of the pivot body 73. The nose segment 53 moves toward the first curved face 81 until the fourth curved face 88 strikes the nose curved face 89 of the intermediate section 55. The nose segment 53 and intermediate section 55 then move toward the pivot body 73 until the bridge curved face 90 of the intermediate section strikes the third curved face 85 of the bridge segment 54. The bridge segment 54, the intermediate section 55, and the nose segment 53 then move toward the pivot body until the second curved face 84 of the bridge segment 54 strikes the first curved face 81 of the pivot body 73.

The nose segment 53 then continues to move toward the pivot body until the fourth curved face 88 fits tightly against the nose curved face 89, the mating curved faces 94 fit tightly together, the bridge curved face 90 fits tightly against the third curved face 85, and the second curved face 84 fits tightly against the first curved face 81. This condition is called the locked position of the locking mechanism 22 and is depicted in FIG. 8A. In the locked position, the locking mechanism prevents the first curved face 81 from sliding against the second curved face 84 and thus prevents the bridge piece 15 from pivoting against the bridge segment 54. Additionally, in the locked position, the locking mechanism prevents the third curved face 85 from sliding against bridge curved face 90 and prevents the fourth curved face 88 from sling against the nose curved face 89 and thus prevents articulation of the articulator 16.

When the wearer depresses push button 25, as indicated by the arrow 30 in FIG. 8B, the push button 25 moves toward the bridge piece 15 and compresses the tensioner 60 between the push button and the bridge piece 15. This moves the first cable end 61 toward the bridge piece 15, which released the tension in the cable 59. This allows the second cable end 62 and the nose segment 53 to move away from the pivot body 73, thus separating and the nose segment from intermediate section 55. Once the nose segment 53 moves away from the intermediate section, the intermediate section can move away from the bridge segment 54 along the cable 59, thus separating the intermediate section and the bridge segment. Once the intermediate section has moved away from the bridge segment, the bridge segment can move away from the pivot body 73 along the cable 59, thus separating the bridge segment and the pivot body. This condition is called the free position of the locking mechanism 22 and is depicted in FIG. 8B. In the free position, the cable 59 couples and aligns the nose segment 53, intermediate section 55, bridge segment 54, and the bridge piece 15, but the flexibility of the cable allow the nose segment to pivot around the intermediate section 55, the intermediate section to pivot around the second end 83 of the bridge segment 54, and the bridge piece 15 to pivot around the first end 82 of the bridge segment.

Although several specific embodiments of the invention have been described and illustrated, the invention is not to be limited to the specific forms or arrangements of parts so described and illustrated. The invention is limited only by the claims.

I claim:

1. An articulated nose bridge for a head mounted display including a left eye display, a right eye display, and a bridge connecting the left eye display to the right eye display, comprising:
    a nose piece configured to rest on a wearer's nose;
    a bridge piece, located between the left eye display and the right eye display; and
    an articulator including:
        a nose end coupled to the nose piece; and
        a bridge end pivotally coupled to the bridge piece to allow a viewing angle of the left eye display and the right eye display to be adjusted by the wearer.

2. The articulated nose bridge of claim 1, additionally comprising a locking mechanism having a locked position and a free position,
    the locking mechanism preventing the bridge piece from pivoting in the locked position; and
    the locking mechanism allowing the bridge piece to pivot in the free position.

3. The articulated nose bridge of claim 2, in which:
    the bridge piece includes a gear segment; and
    the locking mechanism includes a pawl configured to engage with the gear segment when in the locked position.

4. The articulated nose bridge of claim 3, in which the pawl is affixed to the articulator.

5. The articulated nose bridge of claim 3, in which the articulator is structured to allow the pawl to move freely in one dimension.

6. The articulated nose bridge of claim 3, in which the articulator includes:
    a bridge segment including a first end and a second end, the first end including the bridge end of the articulator; and
    a nose segment including a third end and a fourth end, the third end including the nose end of the articulator, and the fourth end pivotally coupled to the second end of the bridge segment.

7. The articulated nose bridge of claim 6, in which:
    the gear segment is a first gear segment;
    the fourth end of the nose segment includes a second gear segment; and
    the pawl includes a first engaging portion and a second engaging portion, the first engaging portion configured to engage with the first gear segment when the locking mechanism is in the locked position, and the second engaging portion configured to engage with the second gear segment when the locking mechanism is in the locked position.

8. The articulated nose bridge of claim 7, in which the locking mechanism moves the second gear segment toward the first gear segment when the locking mechanism is moved into the locked position.

9. The articulated nose bridge of claim 3, in which the articulator includes:
    a bridge segment including a first end and a second end, the first end including the bridge end of the articulator; and
    a nose segment including a third end and a fourth end, the third end including the nose end of the articulator, the fourth end configured to slip over a portion of the bridge segment from the second end allowing longitudinal adjustment of the articulator.

10. The articulated nose bridge of claim 9, in which:
    the second end of the bridge segment is configured to expand against an internal surface of the nose segment when an internal pressure is applied to the second end of the bridge segment; and
    the pawl includes a first engaging portion and a second engaging portion, the first engaging portion configured to engage with the gear segment, and the second engaging portion includes a wedge configured to apply the internal pressure to the second end when the locking mechanism is in the locked position.

11. The articulated nose bridge of claim 10, in which:
    the pawl engages the gear segment and the wedge applies internal pressure to the second end when the locking mechanism is in the locked position.

12. The articulated nose bridge of claim 2, in which the articulator includes:
    a bridge segment including a first end and a second end, the first end including the bridge end of the articulator; and
    a nose segment including a third end and a fourth end, the third end including the nose end of the articulator, and the fourth end pivotally coupled to the second end of the bridge segment.

13. The articulated nose bridge of claim 12, in which the locking mechanism in the locked position prevents the nose segment from pivoting about the second end of the bridge segment.

14. The articulated nose bridge of claim 12, in which the fourth end of the nose segment includes a gear segment; and the locking mechanism includes a pawl configured to engage with the gear segment when in the locked position.

15. The articulated nose bridge of claim 2, in which the articulator includes:

a bridge segment including a first end and a second end, the first end including the bridge end of the articulator; and a nose segment including a third end and a fourth end, the third end including the nose end of the articulator, and the fourth end being configured to slip over a portion of the bridge segment from the second end allowing longitudinal adjustment of the articulator.

16. The articulated nose bridge of claim 15, in which the locking mechanism prevents the bridge segment from moving longitudinally within the nose segment when the locking mechanism is in the locked position.

17. The articulated nose bridge of claim 15, in which:

the second end of the bridge segment is configured to expand against an internal surface of the nose segment when an internal pressure is applied to the second end of the bridge segment; and the locking mechanism includes a wedge, the wedge applying the internal pressure to the second end in the locked position.

18. The articulated nose bridge of claim 2, in which:

the bridge piece defines a first through hole;

the articulator includes:

a nose segment including the nose end, a bridge segment including the bridge end and defining a second through hole; and the locking mechanism includes:

a cable having a cable end affixed to the nose segment, the cable passing through the first through hole and the second through hole; and a tensioner, the tensioner coupled to the cable to pull the cable end toward the bridge piece to compress the bridge segment against the bridge piece.

19. The articulated nose bridge of claim 18 in which:

the articulator additionally includes an intermediate section interposed between the nose segment and the bridge segment, the intermediate section defining a third through hole; and the cable passes through the third though hole.

20. The articulated nose bridge of claim 2, in which the locking mechanism includes a spring, the spring configured to move the locking mechanism into the locked position from the free position.

21. The articulated nose bridge of claim 1, in which the nose end of the articulator is pivotally coupled to the nose piece.

\* \* \* \* \*